(12) United States Patent
Ravkine

(10) Patent No.: US 10,498,467 B1
(45) Date of Patent: Dec. 3, 2019

(54) CLASSIFYING STATIC LEAF NODES IN A MOTION DETECTION SYSTEM

(71) Applicant: Cognitive Systems Corp., Waterloo (CA)

(72) Inventor: Mikhail Ravkine, Waterloo (CA)

(73) Assignee: Cognitive Systems Corp., Waterloo (CA)

(*) Notice: Subject to any disclaimer, the term of this patent is extended or adjusted under 35 U.S.C. 154(b) by 0 days.

(21) Appl. No.: 16/256,377

(22) Filed: Jan. 24, 2019

(51) Int. Cl.
| | |
|---|---|
| *H04B 17/11* | (2015.01) |
| *H04W 52/02* | (2009.01) |
| *H04B 17/318* | (2015.01) |
| *H04W 76/34* | (2018.01) |

(52) U.S. Cl.
CPC ........... *H04B 17/11* (2015.01); *H04B 17/318* (2015.01); *H04W 52/0238* (2013.01); *H04W 52/0254* (2013.01); *H04W 76/34* (2018.02)

(58) Field of Classification Search
CPC ..... H04B 17/11; H04B 17/318; H04W 76/34; H04W 76/30; H04W 76/32; H04W 76/36; H04W 76/38; H04W 76/03; H04W 52/0238; H04W 52/0254
See application file for complete search history.

(56) References Cited

U.S. PATENT DOCUMENTS

| | | | |
|---|---|---|---|
| 4,054,879 A | 10/1977 | Wright et al. | |
| 4,649,388 A | 3/1987 | Atlas | |
| 4,740,045 A | 4/1988 | Goodson et al. | |
| 5,270,720 A | 12/1993 | Stove | |
| 5,696,514 A | 12/1997 | Nathanson et al. | |
| 6,075,797 A | 6/2000 | Thomas | |
| 6,380,882 B1 | 4/2002 | Hegnauer | |
| 6,573,861 B1 | 6/2003 | Hommel et al. | |
| 7,652,617 B2 | 1/2010 | Kurtz et al. | |

(Continued)

FOREIGN PATENT DOCUMENTS

| | | |
|---|---|---|
| CA | 2834522 | 5/2014 |
| WO | 2014/201574 | 12/2014 |

(Continued)

OTHER PUBLICATIONS

Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.

(Continued)

*Primary Examiner* — Ian N Moore
*Assistant Examiner* — Brian T Le
(74) *Attorney, Agent, or Firm* — Henry Patent Law Firm PLLC

(57) ABSTRACT

In a general aspect, a motion detection system manages leaf nodes used for sounding by one or more access points. For example, an access point identifies one or more static leaf nodes based on presence activity of each leaf node in a calibration window. A health score is determined for each AP-leaf node link for each calibration window based on AP-leaf node link quality information. One or more of the static leaf nodes are selected to be used for sounding in the motion detection system based on the health scores for each of the AP-leaf node links. The motion detection system is then updated to use the selected one or more static leaf nodes for motion detection.

18 Claims, 11 Drawing Sheets

(56) References Cited

U.S. PATENT DOCUMENTS

| | | |
|---|---|---|
| 8,660,578 B1 | 2/2014 | Yang et al. |
| 8,710,984 B2 | 4/2014 | Wilson et al. |
| 8,836,344 B2 | 9/2014 | Habib et al. |
| 9,030,321 B2 | 5/2015 | Breed |
| 9,523,760 B1 | 12/2016 | Kravets et al. |
| 9,524,628 B1 | 12/2016 | Omer et al. |
| 9,584,974 B1 | 2/2017 | Omer et al. |
| 9,743,294 B1 | 8/2017 | Omer et al. |
| 9,927,519 B1 | 3/2018 | Omer et al. |
| 9,933,517 B1 | 4/2018 | Olekas et al. |
| 9,989,622 B1 | 6/2018 | Griesdorf et al. |
| 10,004,076 B1 | 6/2018 | Griesdorf et al. |
| 10,048,350 B1 | 8/2018 | Piao et al. |
| 10,051,414 B1 | 8/2018 | Omer et al. |
| 10,108,903 B1 | 10/2018 | Piao et al. |
| 10,109,167 B1 | 10/2018 | Olekas et al. |
| 10,109,168 B1 | 10/2018 | Devison et al. |
| 10,111,228 B2 | 10/2018 | Griesdorf et al. |
| 10,129,853 B2 | 11/2018 | Manku et al. |
| 2003/0108119 A1 | 6/2003 | Mohebbi et al. |
| 2007/0296571 A1 | 12/2007 | Kolen |
| 2008/0119130 A1 | 5/2008 | Sinha |
| 2008/0240008 A1 | 10/2008 | Backes et al. |
| 2008/0303655 A1 | 12/2008 | Johnson |
| 2009/0062696 A1 | 3/2009 | Nathan et al. |
| 2010/0130229 A1 | 5/2010 | Sridhara et al. |
| 2010/0315284 A1 | 12/2010 | Trizna et al. |
| 2012/0025849 A1* | 2/2012 | Habib ............... G01S 5/0289 324/647 |
| 2012/0115512 A1 | 5/2012 | Grainger et al. |
| 2012/0146788 A1 | 6/2012 | Wilson et al. |
| 2013/0113647 A1 | 5/2013 | Sentelle et al. |
| 2013/0162459 A1 | 6/2013 | Aharony et al. |
| 2013/0283256 A1 | 10/2013 | Proud |
| 2014/0135042 A1 | 5/2014 | Buchheim et al. |
| 2014/0247179 A1 | 9/2014 | Furuskog |
| 2014/0286380 A1 | 9/2014 | Prager et al. |
| 2015/0043377 A1 | 2/2015 | Cholas et al. |
| 2015/0063323 A1 | 3/2015 | Sadek et al. |
| 2015/0078295 A1 | 3/2015 | Mandyam et al. |
| 2015/0098377 A1 | 4/2015 | Amini et al. |
| 2015/0195100 A1 | 7/2015 | Imes et al. |
| 2015/0212205 A1 | 7/2015 | Shpater |
| 2015/0245164 A1 | 8/2015 | Merrill |
| 2015/0288745 A1 | 10/2015 | Moghaddam et al. |
| 2015/0304886 A1 | 10/2015 | Liu et al. |
| 2015/0338507 A1 | 11/2015 | Oh et al. |
| 2015/0350849 A1 | 12/2015 | Huang et al. |
| 2016/0018508 A1 | 1/2016 | Chen et al. |
| 2016/0088631 A1 | 3/2016 | Hedayat et al. |
| 2016/0135205 A1 | 5/2016 | Barbu et al. |
| 2016/0183059 A1 | 6/2016 | Nagy et al. |
| 2016/0187475 A1 | 6/2016 | Horng et al. |
| 2016/0210838 A1 | 7/2016 | Yan et al. |
| 2017/0042488 A1 | 2/2017 | Muhsin |
| 2017/0146656 A1 | 5/2017 | Belsley et al. |
| 2017/0278374 A1 | 9/2017 | Skaaksrud |
| 2017/0280351 A1 | 9/2017 | Skaaksrud |
| 2017/0311279 A1 | 10/2017 | Martinez et al. |
| 2017/0343658 A1 | 11/2017 | Ramirez et al. |
| 2018/0180706 A1 | 6/2018 | Li et al. |
| 2018/0205468 A1* | 7/2018 | Gowdar ............... H04B 17/21 |
| 2018/0330293 A1 | 11/2018 | Kulkarni et al. |

FOREIGN PATENT DOCUMENTS

| | | |
|---|---|---|
| WO | 2015/168700 | 11/2015 |
| WO | 2016/066822 | 5/2016 |
| WO | 2016/110844 | 7/2016 |
| WO | 2017/106976 | 6/2017 |
| WO | 2017/132765 | 8/2017 |
| WO | 2017/210770 | 12/2017 |
| WO | 2018/094502 | 5/2018 |

OTHER PUBLICATIONS

Youssef, Moustafa, et al., "Challenges: Device-free Passive Localization for Wireless Environments", Mobicom 07 Proceedings of the 13th Annual ACM International Conference on Mobile Computing and Networking, Sep. 2007, 11 pgs.

USPTO, Notice of Allowance dated Aug. 7, 2019, in U.S. Appl. No. 16/256,367, 20 pgs.

USPTO, Non-Final Office Action dated Mar. 25, 2019, in U.S. Appl. No. 16/256,367, 22 pgs.

* cited by examiner

CLASSIFYING STATIC LEAF NODES IN A MOTION DETECTION SYSTEM

BACKGROUND

The following description relates to detecting motion of an object in a space based on wireless signals.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DETAILED DESCRIPTION

As an overview, a motion detection system may be configured to detect motion in a space based on changes in wireless signals transmitted between devices through a space over a communication channel. In some instances, a motion detection device in the motion detection system may communicate with one or more other devices, which may or may not be part of the motion detection system, e.g. leaf nodes, via wireless signals to acquire channel information that may then be used to perform motion sensing. In some cases, it may be advantageous for the motion detection system to choose from which available devices it collects channel information that will be used in motion sensing applications.

Aspects of the present disclosure may provide certain technical advantages and improvements. In some cases, controlling which devices from which channel information is obtained improves the quality of data to be used in motion sensing applications, thus improving the motion sensing results. In some cases, according to aspects of the present disclosure, collecting channel information from certain select devices may further improve the operation of motion detection systems, such as monitoring and alarm systems, to provide more accurate and useful assessments of motion and more accurately determine a status of the space, in addition to other technical improvements to the operation of monitoring and alarm systems. In some instances, the motion detection system determines which devices to select using existing features of wireless communication devices and networks.

In some aspects of what is described here, a motion detection system may select which leaf node devices will be used for collecting channel information. In some instances, the motion detection system selects only fixed, or static, leaf nodes. In some cases, a fixed leaf node device may be selected based on link quality compared with other fixed leaf node devices. In other aspects, fixed leaf node devices are identified and/or selected during a calibration window.

Figure 1:
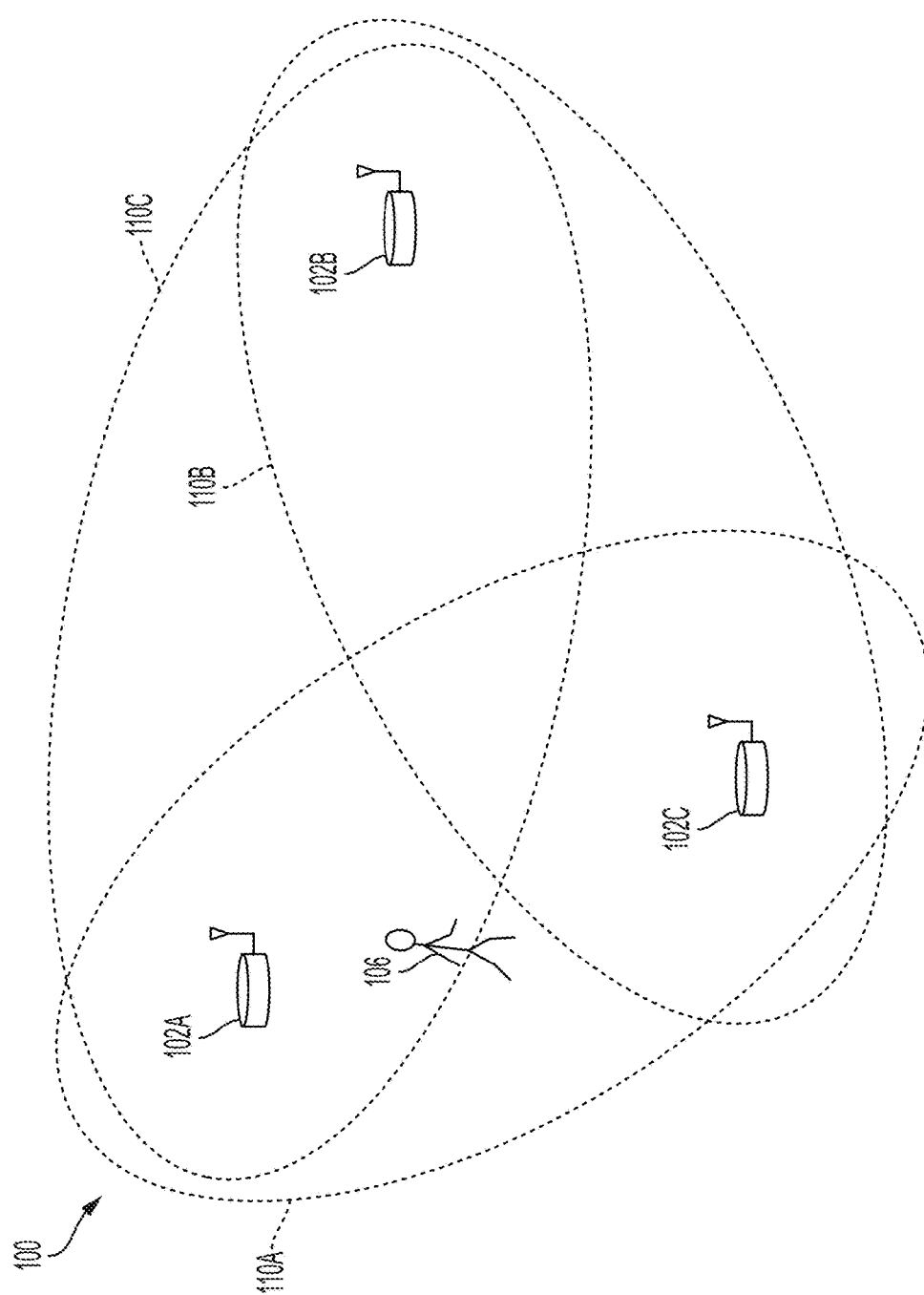
FIG. 1 is a diagram showing an example wireless communication system.

FIG. 1 illustrates an example wireless communication system 100. The example wireless communication system 100 includes three wireless communication devices—a first wireless communication device 102A, a second wireless communication device 102B, and a third wireless communication device 102C. The example wireless communication system 100 may include additional wireless communication devices 102 and/or other components (e.g., one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others. In the example shown in FIG. 1, the wireless communication devices 102A, 102B, 102C can be, or may include, standard wireless network components. For example, the wireless communication devices 102A, 102B, 102C may be commercially-available Wi-Fi devices.

In some cases, the wireless communication devices 102A, 102B, 102C may be Wi-Fi access points (APs) or another type of wireless access point (AP). The wireless communication devices 102A, 102B, 102C may be configured to perform one or more operations as described herein that are embedded as instructions (e.g., software or firmware) on the wireless communication devices. In some cases, the wireless communication devices 102A, 102B, 102C may be nodes of a wireless mesh network. A wireless mesh network may refer to a decentralized wireless network whose nodes (e.g. wireless communication devices 102) communicate directly in a point-to-point manner without using a central access point, base station or network controller, for example. Wireless mesh networks may include mesh clients, mesh routers, or mesh gateways. The mesh network may be based on a commercially-available mesh network system (e.g. GOOGLE Wi-Fi). In some instances, a wireless mesh network is based on the IEEE 802.11s standard. In some instances, a wireless mesh network is based on Wi-Fi ad hoc or another standardized technology. In some cases, another type of standard or conventional Wi-Fi transceiver device may be used by wireless communication devices 102. The wireless communication devices 102A, 102B, 102C may perform motion detection using types of wireless protocols for wireless communication, either standard or non-standard, other than Wi-Fi protocols.

In the example shown in FIG. 1, the wireless communication devices, e.g., 102A, 102B transmit wireless signals over a communication channel (e.g., according to a wireless network standard, a motion detection protocol, a presence detection protocol, or other standard or non-standard protocol). For example, the wireless communication devices may generate motion probe signals for transmission to probe a space to detect motion or presence of an object. In some implementations, the motion probe signals may include standard signaling or communication frames that include standard pilot signals used in channel sounding (e.g., channel sounding for beamforming according to the IEEE 802.11ac-2013 standard). In some cases, the motion probe signals include reference signals known to all devices in the network. In some instances, one or more of the wireless communication devices may process motion detection signals, which are signals received based on motion probe signals transmitted through the space. For example, the motion detection signals may be analyzed to detect motion of an object in a space, lack of motion in the space, or presence or absence of an object in the space, based on changes (or lack thereof) detected in the communication channel.

The wireless communication devices transmitting motion probe signals, e.g. 102A, 102B, may operate as source devices. In some cases, wireless communication devices 102A, 102B may broadcast the wireless motion probe signals (e.g., described above). In other cases, the wireless communication devices 102A, 102B may send wireless signals addressed to other wireless communication device 102C and other devices (e.g., a user equipment, a client device, a server, etc.). The wireless communication device 102C as well as the other devices (not shown) may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In some examples, the wireless communication device 102C, operating as a sensor device, processes the wireless signals received from the wireless communication devices 102A, 102B to detect motion of an object in a space accessed by the wireless signals. In some examples, another device or computing system processes the wireless signals received by the wireless communication device 102C from the wireless communication devices 102A, 102B to detect motion of an object in a space accessed by the wireless signals. In some cases, the wireless communication device 102C (or another system or device) processes the wireless signals to detect presence or absence of an object in a space when lack of motion is detected. In some instances, the wireless communication device 102C (or another system or device) may perform one or more operations as described below with respect to any of FIGS. 3-8 or in the example processes described with respect to FIGS. 9-10, or another type of process for identifying and selecting fixed leaf nodes, and updating the motion detection system to use the selected fixed leaf nodes for motion detection. In an example, the wireless communication device 102C, e.g. an AP, transmits wireless signals, e.g. sounding signals, and the wireless communication devices 102A, 102B, e.g. leaf nodes, receive and process the wireless signals, and return channel response information to the wireless communication device 102C.

The wireless signals used for motion detection can include, for example, a beacon signal (e.g., Bluetooth Beacons, Wi-Fi Beacons, other wireless beacon signals), pilot signals (e.g., pilot signals used for channel sounding, such as in beamforming applications, according to the IEEE 802.11ac-2013 standard), or another standard signal generated for other purposes according to a wireless network standard, or non-standard signals (e.g., random signals, reference signals, etc.) generated for motion detection or other purposes. In some cases, the wireless signals used for motion detection are known to all devices in the network.

In some examples, the wireless signals may propagate through an object (e.g., a wall) before or after interacting with a moving object, which may allow the moving object's movement to be detected without an optical line-of-sight between the moving object and the transmission or receiving hardware. Conversely, the wireless signals may indicate the absence of an object in the space when lack of motion is detected. For example, based on the received wireless signals, the wireless communication device 102C may generate motion data, presence data, or both. In some instances, the wireless communication device 102C may communicate the motion detection data, to another device or system, such as a security system, that may include a control center for monitoring movement within a space, such as a room, building, outdoor area, etc.

In some implementations, the wireless communication devices 102A, 102B may be configured to transmit motion probe signals (e.g., as described above) on a separate wireless communication channel (e.g., a frequency channel or coded channel) from wireless network traffic signals. For example, the modulation applied to the payload of a motion probe signal and the type of data or data structure in the payload may be known by the wireless communication device 102C, which may reduce the amount of processing that the wireless communication device 102C performs for motion and presence detection. The header may include additional information such as, for example, an indication of whether motion was detected by another device in the communication system 100, an indication of the modulation type, an identification of the device transmitting the signal, etc.

In some instances, wireless signals received at each of the wireless communication devices 102 may be analyzed to determine channel information for the different communication links in the network (e.g. between respective pairs of wireless communication devices in the network). The channel information may be representative of a physical medium that applies a transfer function to wireless signals that traverse the space. In some instances, the channel information includes channel response information. Channel response information may refer to known channel properties of a communication link, and may describe how a wireless signal propagates from a transmitter to a receiver, representing the combined effect of, for example, scattering, fading, and power decay within the space between the transmitter and receiver. In particular, a link may correspond to a receive (Rx)/transmit (Tx) antenna pair. Various configurations of the Rx/Tx antennas may be supported. For example, for a 3 Rx antenna/3 Tx antenna (e.g. 3×3) configuration, a total of 9 channel responses may be observed; for a 3×2 configuration, 6 channel responses may be observed; for a 2×2 configuration, 4 channel responses may be observed; for a 2×1 configuration, 2 channel responses may be observed. In some instances, a 4×4 or 8×8 configuration may be possible, thus providing 16 or 64 channel responses, respectively.

In some instances, the channel information includes beamforming state information. Beamforming (or spatial filtering) may refer to a signal processing technique used in multi antenna (multiple-input/multiple-output (MIMO)) radio systems for directional signal transmission or reception. Beamforming can be achieved by combining elements in an antenna array in such a way that signals at particular angles experience constructive interference while others experience destructive interference. Beamforming can be used at both the transmitting and receiving ends in order to achieve spatial selectivity. In some cases (e.g., the IEEE 802.11ac standard), a beamforming steering matrix is used by a transmitter. The beamforming steering matrix may include a mathematical description of how the antenna array should use each of its individual antenna elements to select a spatial path for transmission. While certain aspects are described herein with respect to channel response information or beamforming state information, other types of channel information may also be used in the aspects described as well.

In the example shown in FIG. 1, the wireless communication system 100 is illustrated as a wireless mesh network, with wireless communication links between each of the respective wireless communication devices 102. In the example shown, the wireless communication link between the wireless communication device 102C and the wireless communication device 102A can be used to probe a first motion detection zone 110A, the wireless communication link between the wireless communication device 102C and the wireless communication device 102B can be used to probe a second motion detection zone 110B, and the wireless communication link between the wireless communication device 102A and the wireless communication device 102B can be used to probe a third motion detection zone 110C. In some instances, each wireless communication device 102 may be configured to detect motion in each of the motion detection zones 110 accessed by that device by processing received signals that are based on wireless signals transmitted on links between the wireless communication devices 102 in the motion detection zones 110. For example, when object 106 shown in FIG. 1 moves between the first motion detection zone 110A and the third motion detection zone 110C, the wireless communication devices 102 may detect the motion based on signals received that are based on wireless signals transmitted through the respective motion detection zones 110. For instance, the wireless communication device 102A can detect motion of the person in both the first and third motion detection zones 110A, 110C, the wireless communication device 102B can detect motion of the person 106 in the second and third motion detection zones 110B, 110C, and the wireless communication device 102C can detect motion of the person 106 in the first and second motion detection zones 110A, 110B.

In some instances, the motion detection zones 110 can include, for example, air, solid materials, liquids, or another medium through which wireless electromagnetic signals may propagate. In the example shown in FIG. 1, the first motion detection zone 110A provides a wireless communication channel between the first wireless communication device 102A and the third wireless communication device 102C, the second motion detection zone 110B provides a wireless communication channel between the second wireless communication device 102B and the third wireless communication device 102C, and the third motion detection zone 110C provides a wireless communication channel between the first wireless communication device 102A and the second wireless communication device 102B. In some aspects of operation, wireless signals transmitted on a wireless communication channel (separate from or shared with the wireless communication channel for network traffic) are used to detect movement. The objects can be any type of static or moveable object, and can be living or inanimate. For example, the object can be a human (e.g., as depicted FIG. 1), an animal, an inorganic object, or another device, apparatus, or assembly, an object that defines all or part of the boundary of a space (e.g., a wall, door, window, etc.), or another type of object. In some implementations, motion information from the wireless communication devices may trigger further analysis to determine presence or absence of an object when motion of the object is not detected.

In some implementations, the wireless communication system 100 may be, or may include, a motion detection system. The motion detection system may include one or more of the wireless communication devices 102A, 102B, 102C and possibly other components. One or more wireless communication devices 102A, 102B, 102C, in the motion detection system may be configured for motion detection. The motion detection system may include a database that stores signals. The stored signals may include respective measurements or metrics (e.g., channel response information, beamforming state information or other channel information) for each received signal, and the stored signals may be associated with a channel state, e.g. motion, lack of motion, etc. In some instances, one of the wireless communication devices 102 of the monitoring system may operate as a central hub or server for processing received signals and other information to detect motion. A wireless communication device 102, or other similar wireless communication device, of the monitoring system may identify fixed, or static, leaf nodes communicating with the wireless communication device 102, or the other similar wireless communication device of the monitoring system. In some implementations, a wireless communication device 102, or other device or computing system, of the motion detection system may classify and rank fixed, or static, leaf nodes communicating with the wireless communication device 102, or with the other similar wireless communication devices 102. The storage of data related to processes for identifying fixed leaf nodes, and/or classifying and selecting fixed leaf nodes for sounding in the monitoring system may be performed on a wireless communication device 102 configured as an AP device (e.g. gateway device), another type of computing device, in the motion detection system, or in some cases, may be performed in the cloud.

Figure 2:
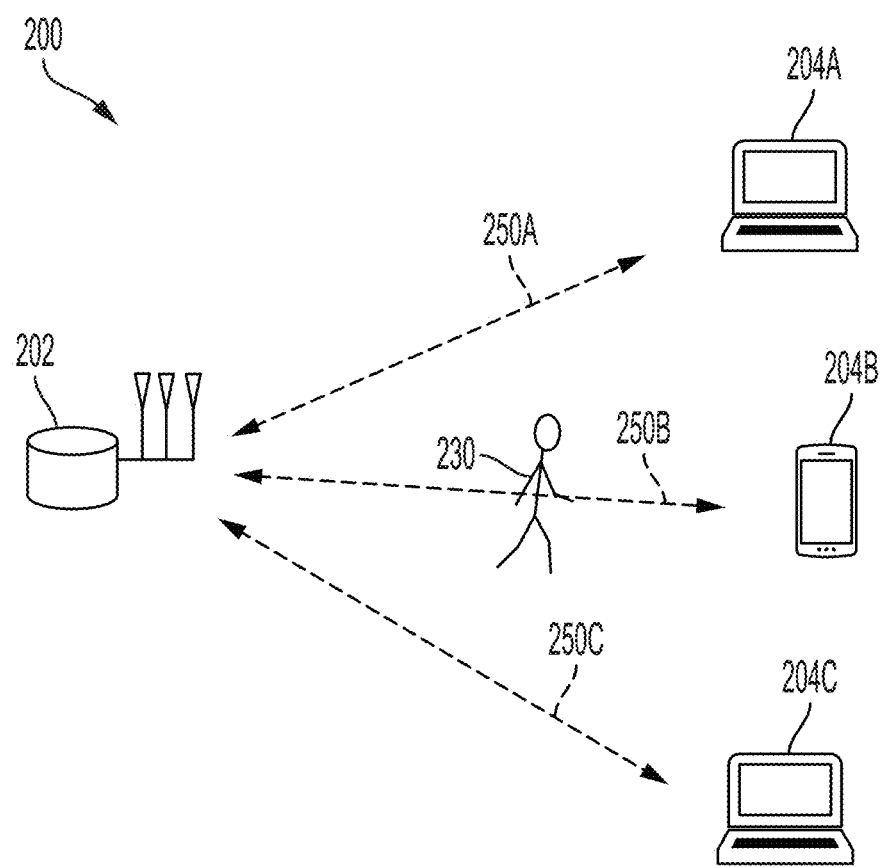
FIG. 2 is a diagram showing an example architecture of a motion detection system.

FIG. 2 shows a diagram showing an example architecture of an example motion detection system 200. In some cases, the devices in motion detection system 200 communicate according to one or more aspects of an IEEE 802.11 wireless communication standard, or another type of standard or non-standard protocol. In the example shown in FIG. 2, the motion detection system 200 includes a wireless access point (AP) 202 (e.g. wireless communication device 102), one or more leaf devices 204 that may communicate with the AP 202, and in some instances, additional AP or leaf devices, or other types of devices, such as servers. In some instances, the motion detection system includes multiple APs 202 (e.g. wireless communication devices 102 described in FIG. 1) communicating according to a wireless mesh protocol, with one or more leaf nodes 204 connected to each of the APs 202, as shown in FIG. 2.

In some instances, each device-to-device wireless connection in the motion detection system 200 may constitute a motion link 250 from which motion measurements are taken. The motion link between an AP 202 and a leaf node 204 is referred to herein as an AP-leaf node link. A leaf node 204 may be a Wi-Fi device that is used for sounding by an AP 202 in the motion detection system 200. In some instances, leaf nodes 204 are not configured with proprietary motion detection software or hardware, but operate normally according to a particular wireless standard. For example, a leaf node 204 may process a sounding request from an AP 202 as part of normal operations under its operating standard (e.g., the leaf node 204 operating as a smartphone, a smart thermostat, a laptop computer, a tablet device, a set-top-box or streaming device, etc.). In some cases, the APs 202 and the leaf nodes 204 conform to a standard (e.g., the IEEE 802.11) protocol and, as such, do not require motion detection-specific hardware or software to act as a leaf node of the motion detection system 200. Generally, the motion detection system 200 may use any of the leaf nodes 204 in FIG. 2 as sounding nodes to obtain channel information (e.g., channel response information, beamforming state information, etc.) for motion detection. In some cases, it is preferable that leaf nodes 204 used for sounding by an AP 202 have certain characteristics, for example, that they be stationary over time and have a steady power supply, e.g. a smart phone that is plugged in.

In one example, the motion detection system 200 implements a beamforming protocol, e.g. to generate and transmit beamforming information from one wireless device to another wireless device. For example, the wireless communication device 202 can implement a beamforming protocol as described above. In some instances, the AP(s) 202 can detect motion of the objects 230 based on analyzing beamforming matrices (e.g., steering or feedback matrices). In some examples, sounding and and/or beamforming are performed on a motion link, e.g. motion link 250A between AP 202 and a leaf device 204A, and motion is detected at the AP 202 by observing changes in a beamforming matrix (e.g., the steering or feedback matrix) associated with the motion link. Motion may also be localized by the AP 202 based on changes in the respective beamforming matrices for each connection with a leaf device 204. In a mesh configuration (e.g., the motion detection system 202 with multiple APs 202 interconnected—not shown in FIG. 2), sounding and beamforming is performed between APs 202 and their respective leaf devices 204, and motion information is determined at each of the APs 202. The motion information can then be sent to a hub device (e.g., one of the APs 202) or another device, such as a server, to analyze the motion information and make an overall determination of whether motion has occurred in the space, detect a location of detected motion, or both.

In some implementations of the example motion detection system 200 shown in FIG. 2, the number of leaf nodes 204 communicating with AP 202 is unknown or varies over time. In some instances, the number of leaf nodes 204 communicating with AP 202 changes as mobile leaf nodes 204 move in and/or out of communication with the AP 202. For example, a user carrying a mobile device, e.g. leaf node 204B, may enter a space and the mobile device may begin communicating with AP 202 which is performing motion sensing activities. However, generally in a mesh configuration, a leaf node is able to choose any of the mesh APs and is additionally free to switch between them at any time, thus affecting the number of leaf nodes communicating with any particular AP 202. While the mobile device is communicating with the AP 202, the AP 202 may collect information from the mobile device and/or perform sounding with the mobile devices. The user may subsequently leave the space with the mobile device, and the mobile device moves out of range of the AP 202, but later comes into range of AP 202 again. In some contexts, data gathered by the AP 202 from this mobile device may not be stable enough to use for making determinations on motion.

In some cases, using leaf nodes in a motion detection system may affect the performance of the system. For example, resources necessary to perform sounding on motion links between devices, e.g. motion links 250 between AP 202 and leaf nodes 204, in order to collection channel information, may be limited. In some instances, central processing unit (CPU) and memory usage rise linearly with the number of active AP-leaf node links used for sounding in the motion detection system. In some cases, the motion detection system may be communicating with leaf nodes that are static (with a fixed location), and with leaf nodes that are mobile (with variable location), but cannot differentiate the fixed leaf nodes from the mobile leaf nodes. In some instances, the location of the leaf nodes may affect the performance of the motion detection system. In some cases, the motion detection system observes that some leaf nodes sound poorly during the sounding process to collect channel information, resulting in bad channel information being provided to the motion detection system. In some instances, the bad channel information received from a poor sounding leaf node may cause overall system degradation. In some instances, the poor sounding leaf node may be due to the fact that it is a mobile leaf node, and not a fixed leaf node. In other instances, the motion detection system can be overwhelmed in situations in which a large number of leaf nodes appear all at once or within a short-time period, e.g. on system initialization, after rebooting the system, etc. In some cases, the user may also be overwhelmed with notifications from the system, e.g. when a user is notified and asked to confirm that a leaf node is added to the system.

As described herein, a closed-loop continuous link health measurement and classification system for AP-leaf node links is provided to address one or more of these issues and improve the operation of the motion detection system. In some instances, the system may be applied to AP-AP mesh links or other types of motion links in a motion detection system.

Figure 3:
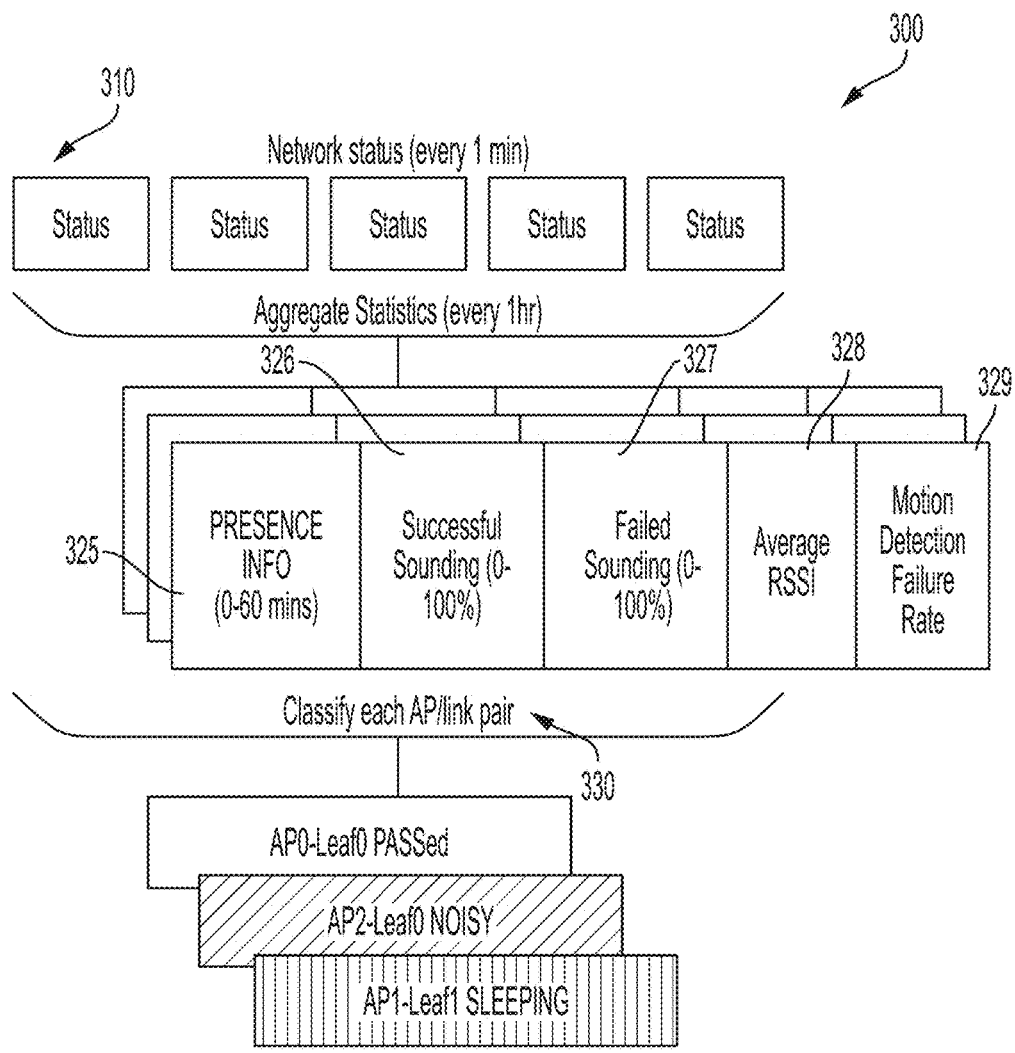
FIG. 3 is a diagram showing an example of AP-leaf node link classification.

FIG. 3 is a diagram showing an example of AP-leaf node link classification. In an implementation, the example link classification 300 classifies each AP-leaf node link in the motion detection system (e.g. motion detection system 200) as a fixed, or static, leaf node or as a mobile leaf node. In some instances, a leaf node (e.g. leaf node 204 in FIG. 2) is communicatively coupled to one or more APs 202 of the motion detection system at various points in time. In some instances, the motion detection system periodically receives a network status report 310 from each AP 202 for a defined time interval, e.g. every minute, every two or three minutes, every hour, etc. The time interval for receiving network status reports may be adjustable. In systems comprising multiple APs 202, one of the APs 202 may act as a hub to collect network status reports 310 from each of the other APs 1210. In some implementations, the motion detection system may have only one AP 202 and, in that case, will not need to receive network status reports 310 from other APs. The network status report 310 for each AP in the motion detection system comprises statistics for each active AP-leaf node link during the defined time interval.

In an implementation, active AP-leaf node links are identified based on the machine address, e.g. medium access control (MAC) address, of the underlying wireless interfaces for the AP and the leaf node. A network status report 310 is provided for each AP-leaf node link. In some instances, an AP-leaf node link is determined to be active during a defined time interval if the leaf node communicates wirelessly with the AP during the time interval. For example, if a leaf node responds to a beacon signal or other signal from an AP during sounding, the AP will mark the leaf node as active in the network status report 310 for that time interval. In some instances, the status reports 310 from multiple time intervals are aggregated to derive statistics for each AP-leaf node link over a calibration period. In some implementations, for each active AP-leaf node link, various metrics in the status reports are tracked and/or calculated for a calibration period, e.g. one hour. In the example classification 300 shown in FIG. 3, the statistics received in 60 network status reports are aggregated over a calibration period of one hour. As shown in FIG. 3, the metrics include a presence information metric 325, a successful sounding metric 326, a failed sounding metric 327, an average received signal strength indicator (RSSI) metric 328, and motion detection failure rate metric 329. In some implementations, other metrics may be used classify a link. In some instances, for a calibration period, a presence information metric 325 indicates the number of status reports 310 during which a particular AP-leaf node link was active. As an example, for a calibration period of one hour with status reports 315 reported every minute, the presence information metric 325 may have an integer value ranging from zero to sixty (0-60). In some implementations, for each AP-leaf node link, a successful sounding metric 326 is calculated indicating the average successful channel frequency response (CFR) sounding rate (range 0-100%), and the failed sounding metric 327 is calculated indicating the average failed CFR sounding rate (range 0-100%). These statistics are related to an AP's attempts to sound a leaf node by sending a sounding request, and whether the leaf node responded (e.g. successful) or did not respond (e.g. unsuccessful). In some cases, an average RSSI metric 328 and motion detection failure rate 329 may be calculated and used to classify an AP-leaf node link. In some instances, a calibration result is calculated (e.g. as described in FIG. 5 or otherwise) for each calibration period, and each active AP-leaf node link is classified 330 based on the calibration result. For example, an active AP-leaf node link may be classified as passed, noisy, or sleeping, described below.

In the examples described here, AP-leaf node links are denoted by an AP number and a Leaf number pair. In the example described in FIGS. 3 and 4, the motion detection system includes three APs—AP0, AP1, and AP2, and two leaf nodes—Leaf0 and Leaf1, communicate with one or more of the APs during the calibration event. Thus, each AP reports status for up to two links, e.g. AP0-Leaf0 and AP0-Leaf1. On the other hand, a leaf node may be associated with one, two, or all three of the APs, and therefore, may be associated with three links, e.g. AP0-Leaf0, AP1-Leaf0, and AP2-Leaf0. The AP and leaf node numbering user here is solely for illustration, as the actual AP-leaf node link pairs are identified by MAC address, described above.

In some implementations, first, an active leaf node is determined to be fixed (e.g. static) or mobile using the presence information metric 325. During experimentation in some example systems, it was observed that an approach of monitoring whether a leaf node jumps from one AP to another is not necessarily indicative of whether the leaf node is fixed or mobile, for example, fixed leafs were observed jumping for various non-obvious reasons. Further, observations of received signal strength indicator (RSSI) measurements of the leaf node alone do not necessarily provide a reliable indication of whether a leaf node was fixed or mobile, in some contexts.

Figure 4:
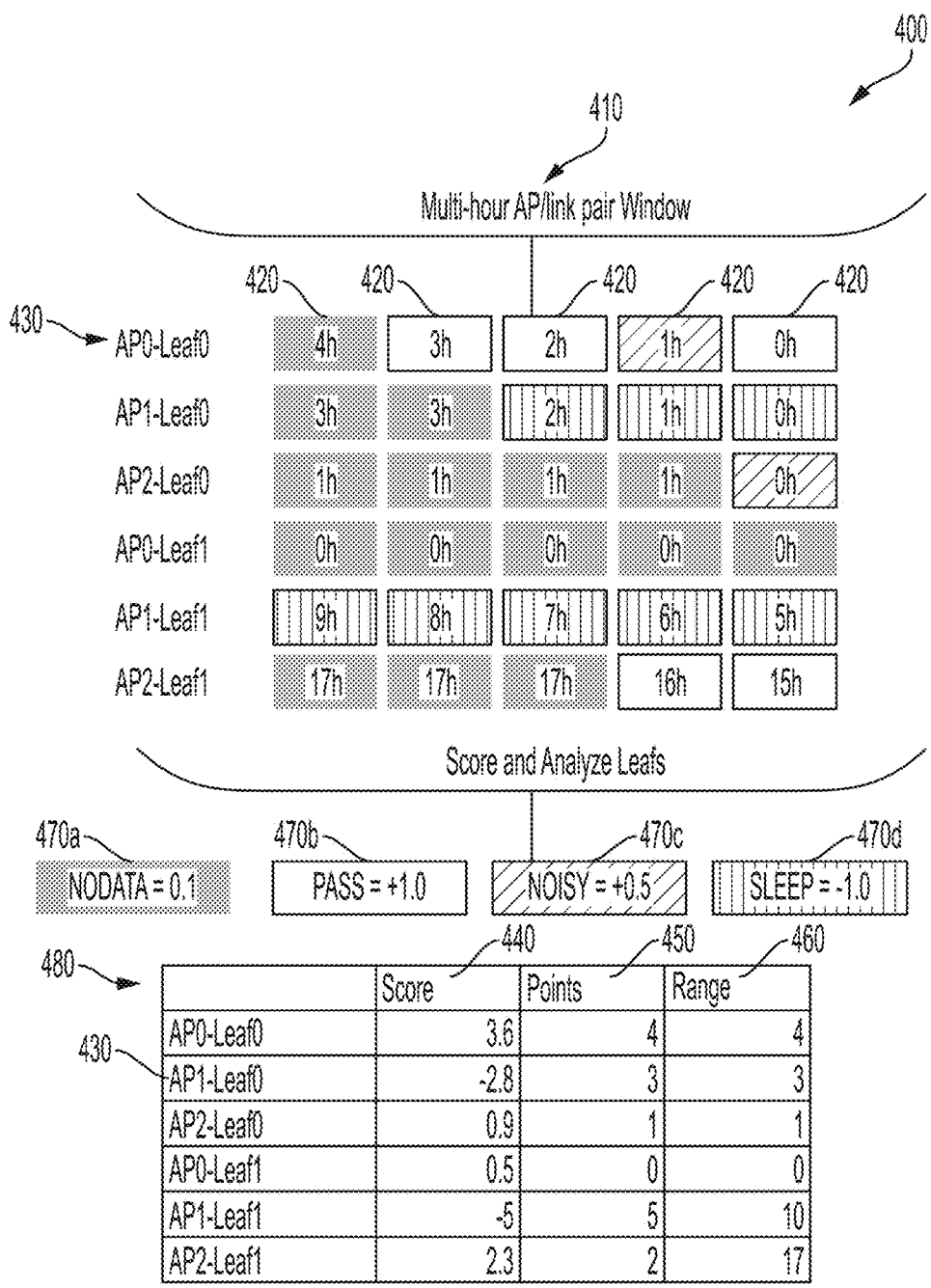
FIG. 4 is a diagram showing an example of evaluating links over a calibration window.

FIG. 4 is a diagram showing an example of evaluating links over a calibration window 410. A calibration window 410 includes multiple calibration periods 420. In this example, each row of table 480 illustrates calibration results 470 (e.g. obtained as described in FIG. 5, or otherwise) for each calibration period 420 in the calibration window 410 for a particular AP-leaf node link 430. In the example shown in FIG. 4, activity of an AP-leaf node link during the calibration window 410 is represented by either a highlighted or greyed-out calibration period 420 in each respective row for that AP-leaf node link. In particular, a greyed-out calibration period 420 (e.g. NODATA 470a) in any calibration window 410 indicates that, based on the presence information metric 325, a particular AP-leaf node link 430 was not detected as being active (or active enough) in that calibration period 420, while other highlighted calibration periods 420 (e.g. PASS 470b, NOISY 470c, and SLEEP 470d) indicate that, based on the presence information metric 325, a particular AP-leaf node link 430 was detected as active (or active enough) in that calibration period 420. The assignment of additional qualifications (e.g. PASS 470b, NOISY 470c, and SLEEP 470d, although other qualifications 570 are available as described in FIG. 5) to active AP-leaf node links are discussed in FIG. 5 For example, a leaf node is marked as present, or active, when the the presence information metric 325 for an AP-leaf node link during the calibration period 420 exceeds a threshold (e.g. presence metric 325>=PRES_THRES (0.9)), as described in decision 520 in FIG. 5). In this example, the presence information metric 325 is a value from 0 to 60, so an AP-leaf node link 430 with a presence information metric 325 with a value of 54 or higher, will be determined active (or active enough) for the calibration period 420 based on a threshold of 90%, while the AP-leaf node link will be determined not active (or active enough) if the value is less than 54 for the calibration period 420. The threshold may be adjustable so, in some instances, a leaf node may be determined to be present/active for a lesser or greater percentage of time during the calibration window 410. In this example, each calibration period 420 is one hour and the calibration window 410 is five hours, meaning there are five calibration reports 420 for each AP-leaf node link 430 to be examined. In an implementation, each AP-leaf node link 430 is assigned a number of points 450 for the calibration window 410. In some instances, the points are assigned based on whether its presence activity exceeded the presence threshold in each calibration period 420. In the example shown, the total points 450 for each AP-leaf node link 430 is derived by adding a point for each highlighted calibration period 420 in the calibration window 410.

In this example, an AP-leaf node link 430 is assigned points 450 in each calibration period 420 of the calibration window 410. In this example, an AP-leaf node link 430 is assigned 0 points if the AP-leaf node link 430 is determined to be 'not active' during the calibration period 420 (e.g. in FIG. 4, the 'not active' link is greyed, not highlighted) or is assigned 1 point if the AP-leaf node link 430 is determined to be 'active' during the calibration period 420 (e.g. in FIG. 4, the 'active' link is highlighted), although values other than 0 or 1 may be assigned to denote presence activity or lack thereof in other implementations. As noted previously, the AP-leaf node link's presence activity may be determined in decision box 520 in FIG. 5, described below.

Returning to calculating points 450, in table 480, AP0-Leaf0 is assigned 1 point for each of the highlighted one-hour calibration periods 420 (e.g. for the most recent calibration periods in which statistics are available for the link—0 h, 1 h, 2 h, and 3 h) and 0 points for the non-highlighted one-hour calibration period (e.g. the calibration period 4 h in which no data is available for the link) for a total of 4 points shown in table 480. In some instances, an AP-leaf node link 430 may not have any data available for any calibration period, e.g. no data is available for AP0-Leaf1, and is assigned 0 total points 450 in table 480. In some cases, the overall assigned points 450 assigned to an AP-leaf node link 430 for the calibration window 410 provides an indication of the AP-leaf node link's presence activity level, and in some instances, may further provide an indication whether the leaf node is a fixed leaf node or a mobile leaf node. However, points alone may not be sufficient to determine with confidence whether the leaf node is fixed or mobile, at least in some contexts.

In some implementations, the total points 450 for an AP-leaf node link 430 is an indication of presence activity, but does not indicate when the data in each calibration period 420 was collected, and consequently, when the link 430 was last active. For example, a calibration event may be initiated once a day, or every 24 hours, which means there are potentially 24 one-hour network status reports 310 for each AP-leaf node link to choose from for the calibration window, with the '0 h' being the most recent network status report and '23 h' being the oldest network status report. In the example in FIG. 4, the calibration window is five hours, and therefore, the network status reports 310 for five calibration periods will be selected for each AP-leaf node link. The most recent calibration period 420 for which data is available in a network status report 310, is the first report for each AP-leaf node link, and then the network status reports 310 for the previous four calibration periods will be used to complete the dataset for the 5-hour calibration window 410. For example, AP0-Leaf0, AP1-Leaf0, and AP2-Leaf0 link pairs 430 were most recently active in the latest calibration period, e.g. '0 h'; AP1-Leaf1 was most recently active in the sixth oldest calibration period '5 h'. AP2-Leaf1 430 was most recently active in the sixteenth and seventeenth oldest calibration periods '15 h' and '16 h', but no data is available for the next three oldest calibration periods so for illustration, these periods 430 are denoted by the next oldest calibration period '17 h' and greyed out.

In some instances, if the most recent presence information metric 325 for an AP-leaf node link 430 is old, the presence activity information for a link 430 is also not current which lowers its relevance when determining whether a leaf node is fixed or mobile. In some cases, a range value 460 is used as an indication of the age of the presence activity data. For example, the presence activity data represented in FIG. 4 for AP0-Leaf0 was collected over the most recent 4 hours (e.g. 0 h, 1 h, 2 h, and 3 h). On the other hand, the most current presence activity data for AP1-Leaf1 was collected 6-10 hours ago (e.g. 5 h, 6 h, 7 h, 8 h, and 9 h), which indicates that no data is available for the 0-5 most recent hours. The data for AP2-Leaf1 was collected even earlier (e.g. at 15 h and 16 h), which indicates that no data is available for the most recent 0-14 hours.

In an implementation, the range 460 for an AP-leaf node link is determined by the age of the oldest calibration period 420 for which data is available to use in the calibration window 410, relative to the most recent calibration period. For example, referring to table 480, the most recent calibration period is '0 h', so the range for AP0-Leaf0 is 0 h-3 h, or 4; the range for AP1-Leaf1 is 0 h-9 h, or 10; and the range for AP2-Leaf 1 is 0 h-16 h, or 17. The range 460 for each AP-leaf node link is illustrated in table 480. The range 460 information, along with the presence activity points 450 may then be used to identify a link as fixed or mobile.

In instances in which the calibration window shifts to accommodate results and statistics for a next calibration period, if there is no additional activity report for an AP-leaf node link, then the score 440 and points 450 for the AP-leaf node link will not change. Referring again to AP2-Leaf1, while the score 440 and points 450 will not change for subsequent hours 0 h to 14 h. However, the range 460 will increase by 1 each subsequent calibration period in which there is no activity on the AP-leaf node link. An increase in the range 460 value thereby decreases the relevance of its historical data while providing additional context as to whether the leaf node is mobile or static.

In an implementation, a leaf node is determined to be a static leaf node when the number of presence activity points 450 equals the range 460 for all links of a leaf node. In the example shown in table 480, each of AP0-Leaf0, AP1-Leaf0, and AP2-Leaf0 link pairs have points 450 that equal its range 460. In this instance, Leaf0 may be identified as a static leaf node because all of its links' points 450 equal its range 460. In some instances, a leaf node may not establish a link with every available AP (e.g. no data is available for an AP0-Leaf1 link pair). In this situation, only links which have data available will be used to make the static or mobile determination for the leaf node; links with no data (e.g. range 460 equals 0) will be ignored. Other (additional or different) criteria may be used to determine that a leaf node is a static leaf node in some cases.

In an implementation, when a leaf node is determined to be a static leaf node, e.g. Leaf0, the motion detection system adds that node as a sounding node. However, when a leaf node is determined to be a mobile node, the motion detection system removes (or does not add) the leaf node as a sounding node. For example, AP0 may select Leaf0 to perform sounding and use the resulting data for motion detection; Leaf1 appears to be mobile based on the example data shown in the table 480, therefore, AP0 may determine not use Leaf1 for motion detection.

In some implementations, the motion detection system classifies the quality of each AP-leaf node link by determining a score 440 (also referred to as a 'health score' herein) for each link, shown in table 480. For example, each AP-leaf node link may be assigned a value based on the link quality data in each network status report 310 for each calibration period 420. In the example shown in FIG. 4, the score 440 for each AP-leaf node link is compiled by adding the link quality values for each calibration period 420 across the calibration window 410 for the AP-leaf node link. In some instances, link quality values are assigned as described in FIG. 5. In the example of FIG. 4, the quality of a link is higher when the score is higher. However, in other implementations, other values may be assigned to represent link quality and the score may be calculated in a different manner, e.g. a lower score may represent a higher quality. In FIG. 4, the AP-leaf node links are ranked according to their quality scores 440. In some instances, only the scores 440 of leaf nodes identified as static are analyzed. For example, Leaf0 was identified as a static leaf node, and the AP0-Leaf0 link pair has the highest score, indicating that link has the best quality over AP1-Leaf0 and AP2-Leaf0. In some cases, AP0 will add the leaf node Leaf0 as a sounding node, or Leaf0 is already a sounding node, AP0 will keep it as a sounding node. In this example, Leaf1 was identified as a static node, therefore its scores are not considered.

Figure 5:
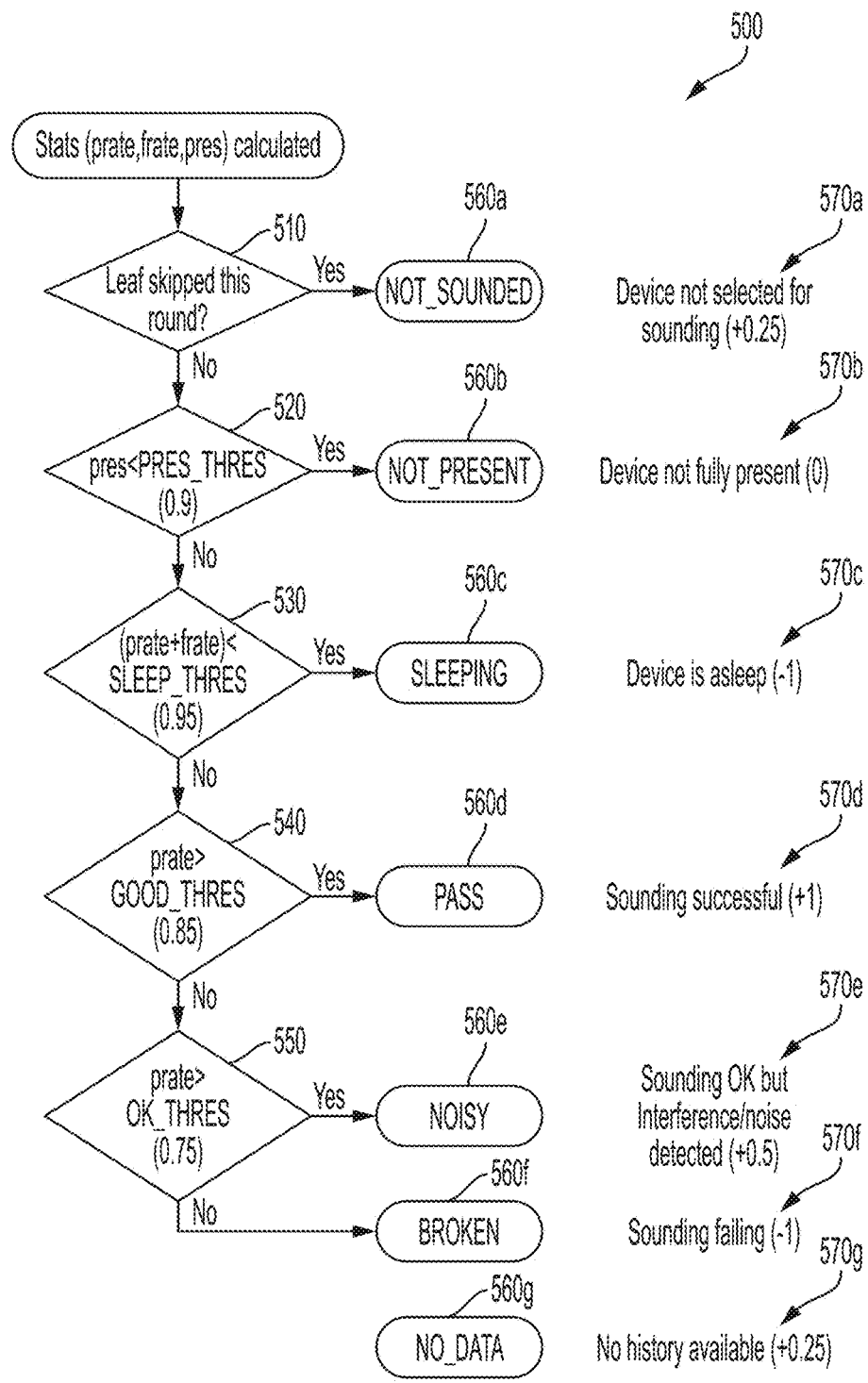
FIG. 5 is a flow diagram showing an example process of classifying leaf node devices.

FIG. 5 is a flow diagram showing an example process 500 of classifying AP-leaf node links. In some implementations, the classification process 500 is performed for each AP-leaf node link in each calibration period 420, e.g. when aggregating statistics as described in FIG. 3. In this example, there are several possible calibration result 560 categories (e.g. NOT_SOUNDED, NOT_PRESENT, SLEEPING, PASS, NOISY, BROKEN, NO_DATA), although in some instances, more or fewer categories may be used for classifying a leaf node. Each calibration result 560 carries a numeric weight based on how desirable the leaf node is from a sounding priority perspective. The numeric weights are summed over a calibration window to derive a score (e.g., the score 440 shown in table 480 in FIG. 4). In some instances, a negative score indicates that sounding that leaf node is undesirable, while a positive score indicates that sounding the leaf node would contribute positively to the performance of the motion detection system. In some cases, the leaf nodes are ranked in priority based on the magnitude of the score, e.g. highest to lowest.

In example process 500, the statistics aggregated for each AP-leaf node link for each calibration period 420 are used to determine a score for that link. At 510, a leaf node that was skipped, e.g. not selected by an AP for sounding, in a particular round (e.g. a calibration period) is classified as NOT_SOUNDED 560a and assigned a base value 570a (e.g. +0.25 points). If the device has been sounded by the AP, then at 520, it is determined whether the device was present enough (e.g. communicated sufficiently) during the calibration period 420. In an implementation, it may be determined whether the presence of the AP-leaf node link exceeds a presence threshold, e.g. using the presence information metric 325 in FIG. 3. In this example, the presence threshold, PRES_THRES, is set at 0.9, which indicates that a link 430 must be active for at least 90% of the calibration period 420. In some instances, the leaf node's presence indicates whether the motion detection system has enough information to properly analyze the link for that calibration period, denoted by the presence threshold. In this example, at 520, a device's presence that does not meet the presence threshold for the calibration period is classified as NOT_PRESENT 560b and assigned a value 570b (e.g. 0 points) indicating the AP-leaf node link was not fully present during the calibration period 420.

When a leaf node meets or exceeds the presence threshold, then at 530, it is determined whether the device is sleeping. In an implementation, the successful sounding metric 326 (represented as "prate" in FIG. 5) and the failed sounding metric 327 (represented as "frate" in FIG. 5), described in FIG. 3, are summed and the result is evaluated against a sleep threshold, SLEEP_THRES. If the result is less than the sleep threshold, the device is determined to be asleep. In this example, sleep threshold, SLEEP_THRES, is set at 0.95, although other values may be used. When the result is less than the sleep threshold for the calibration period, the leaf node is classified as SLEEPING 560c and assigned a value 570c (e.g. −1 points) indicating the AP-leaf node link was sleeping during the calibration period 420.

When a leaf node meets or exceeds the sleep threshold, e.g. it is not sleeping, then at 540, it is determined whether the device performed sounding successfully during the calibration widow. In an implementation, the successful sounding metric 326 (e.g. prate) is evaluated against a passing threshold, GOOD_THRES. If the 'prate' is greater than the passing threshold, the device is determined to be sounding successfully during the calibration period. In this example, the passing threshold, GOOD_THRES, is set at 0.85. When 'prate' is greater than the passing threshold for the calibration period, the leaf node is classified as PASS 560d and assigned a value 570d (e.g. +1 points) indicating the AP-leaf node link was successfully sounding during the calibration period 420.

When a leaf node does not meet the passing threshold, then at 550, it is determined whether the device performed sounding successfully but with interference and/or noise during the calibration period 420. In an implementation, the successful sounding metric 326 ('prate') is evaluated against a lower passing threshold, OK_THRES, of sounding successfully during the calibration period. If 'prate' is greater than the lower passing threshold, OK_THRES, the device is determined to be sounding successfully during the calibration period. In this example, the passing threshold, OK_THRES, is set at 0.75, which is a lower quality than GOOD_THRES. When 'prate' is greater than the lower passing threshold for the calibration period, the leaf node is classified as NOISY 560e and assigned a value 570e (e.g. +0.5 points) indicating the AP-leaf node link was successfully sounding but noisy during the calibration period.

When a leaf node does not meet the lower passing threshold, OK_THRES, then at 550, it is determined that the device is not sounding properly. For example, when 'prate' is less than the lower passing threshold for the calibration period, the leaf node is classified as BROKEN 560f and assigned a value 570f (e.g. −1 point) indicating the AP-leaf node link is broken during the calibration period. In cases when there is no history data available for a leaf node in a calibration period, the AP-leaf node link is classified as NO_DATA 560g and assigned a default value 570g (e.g. +0.25).

In some implementations, after performing the example process 500, each AP-leaf node link in each calibration period 420 of a calibration window 410 will be classified as to the quality of the link and assigned a score. In some cases, the points assigned to the link for each calibration period 420 are summed across the calibration window 410 to derive a score, e.g. score 440 in table 490 of FIG. 4. In some instances, the scores of fixed leaf nodes may be used to rank each of its AP-leaf node links to prioritize which links will provide the motion detection system the best quality sounding data.

Figure 6:
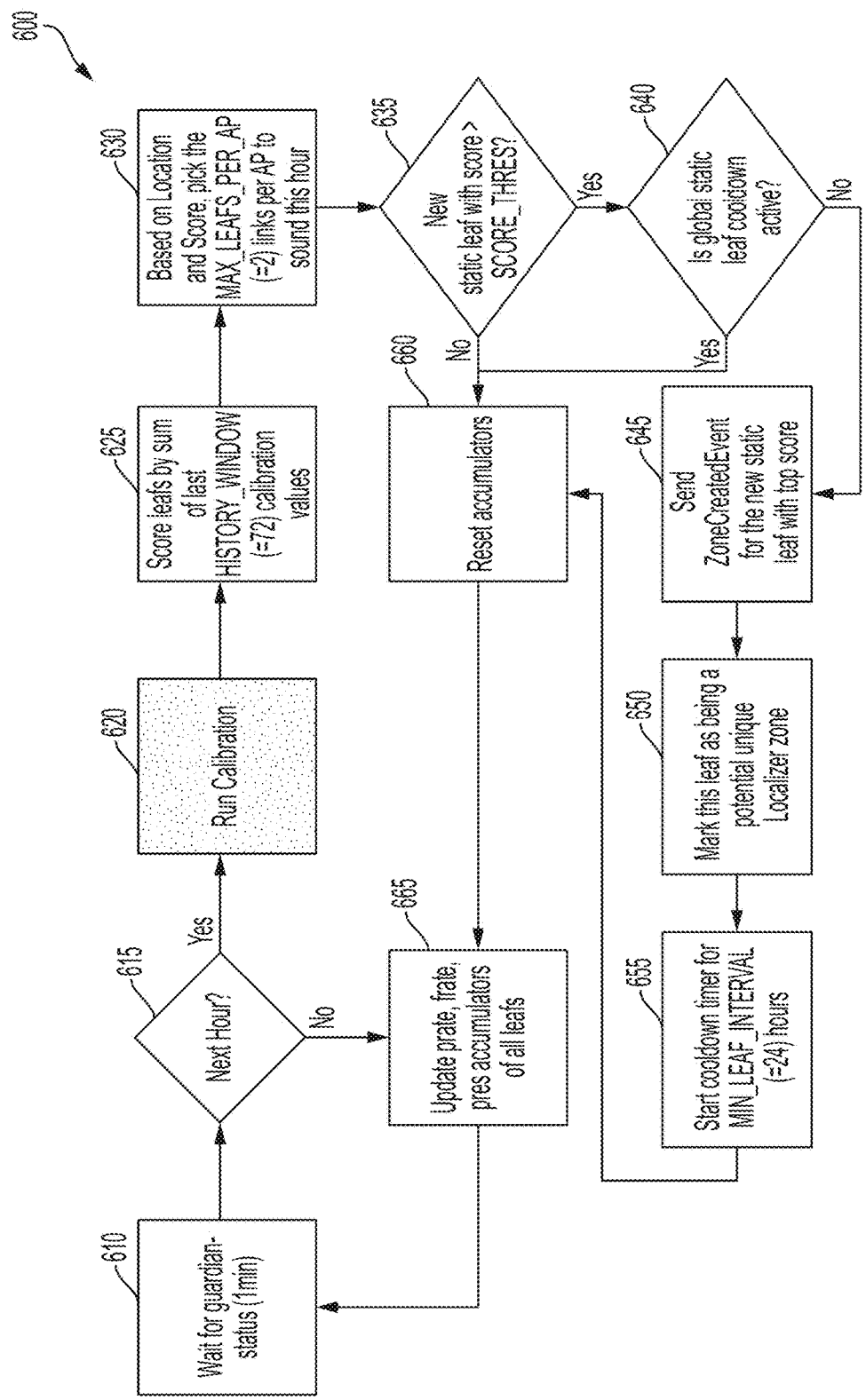
FIG. 6 is a block diagram showing an example of a closed-loop control flow for updating leaf nodes in a motion detection system.

FIG. 6 is a block diagram showing an example of a closed-loop control flow 600 for updating leaf nodes in a motion detection system. In some implementations the example control flow 600 is performed by the motion detection system. In some cases, the example control flow 600 may be performed by the only AP in the motion detection system, by one of a plurality of APs in the motion detection system, or by a separate server using the data reported by a designated AP in the motion detection system. In some instances, the process 600 is performed for each AP in which it selects the leaf node(s) to be used to for motion detection. In this example process 600, network status is reported every minute, and a calibration period is every hour (e.g. as described in FIG. 3). Other calibration periods and network reporting intervals may be used.

At 610, the motion detection system waits to enter guardian status during which it obtains network status for each AP.

At 615, it is determined if a calibration period has completed by checking if it is the next calibration period, e.g. the next hour. If an hour has lapsed and a calibration period 420 has been completed, then at 620, a calibration event is run in which statistics for each AP-leaf node link are aggregated (e.g. as described in FIGS. 3 and 4). At 625, each AP-leaf node link is scored based on the history window. In this example, the history window comprises data and scores for each AP-leaf node link for the last 72 calibration periods.

At 630, the fixed leaf nodes for sounding are selected. For example, the motion detection system may select a maximum of number of leaf nodes to be sounded per AP (e.g. as denoted MAX_LEAFS_PER_AP=2) from the identified fixed leaf nodes for the current calibration event. In some implementations, the leaf nodes are selected based on the scores 440 for each leaf node as described in FIG. 4. In some instances, the location of the leaf node is used in combination with the scores 440. For example, once a static leaf node has proven itself qualified for sounding by achieving a minimum score, it may potentially become its own localizer result location, e.g. detected motion may be localized to the location of the fixed leaf node. In some instances, this option may be offered via an event sent to a user interface of the user's device, e.g. via motion detection application on a user's smartphone. Once a user provides a location of a static leaf via the user interface, the selection of static leaf nodes for sounding may be biased based on the uniqueness of the leaf node locations. In an example, if a unique location has a single leaf and its quality is considered 'ok', then sounding that leaf node will have better motion results than sounding two 'good' leafs in a single zone.

After the maximum number of leaf nodes for each AP are selected, at 635, it is determined whether at least one of the candidate leaf nodes is a newly identified static leaf node with a link quality that exceeds minimum link quality score (e.g. SCORE_THRES). An example of the scores for each AP-leaf node link are described in FIG. 4 (e.g. scores 440 in table 480). In some instances, no static leaf nodes meet the quality score criteria, in which case, at 660, the accumulators are reset (e.g. scores 440, points 450, and range 460 in FIG. 4), and at 665, aggregate statistics for the just-completed calibration period are updated for all AP-leaf node links, such as, presence, successful sounding rate ('prate'), and failed sounding rate (Irate), and any other link statistics being tracked, such as average RSSI and motion detection failure rate. After the accumulators are updated, the system waits to receive the next status report at 610.

In some implementations, when a new static leaf node has been identified that exceeds the minimum quality score, at 640, it is determined if a global static leaf cooldown process is active. For example, the motion detection system may designate a time (i.e. a cooldown period) when new leaf nodes cannot be added to the motion detection system. In some instances, the static leaf cooldown period may be implemented to provide stability to the system and to prevent a cycling in and out of newly selected static leaf nodes. In an example, the cooldown period may be 24 hours. In instances in which the cooldown period is active, the process advances to 660, where the accumulators are reset, statistics for the calibration period are updated at 665, and the system waits to receive the next status report at 610.

In instances where the cooldown period is not active, a new fixed leaf node may be added to the motion detection system. In that case, at 645, an event is generated to report the newly identified and selected static leaf node. For example, the motion detection system may generate a 'ZoneCreatedEvent' to report the new static leaf node, which associates the leaf node and its sounding data with a particular motion zone. As described above, the opportunity to create a new zone is offered to a user via a user interface. In some instances, at 650, the new static leaf node is marked as being a potential unique localizer zone, e.g. depending on whether the user indicates a new zone via the user interface.

After the new leaf node has been selected for sounding, the cooldown timer is started, or reset if still running, at 655. In this example, the cooldown timer, MIN_LEAF_INTERVAL, is set to 24 hours so that newly identified fixed leaf nodes cannot be added to the motion detection system during that time. The process then advances to 660 where the accumulators are reset, statistics for the calibration period are updated at 665, and the system waits to receive the next status report at 610. In cases when a calibration period is not complete at 615 (e.g. one hour of network status reports have not been received), the statistics for the current calibration period are updated at 665, and the system waits to receive the next status report at 610.

Figure 7:
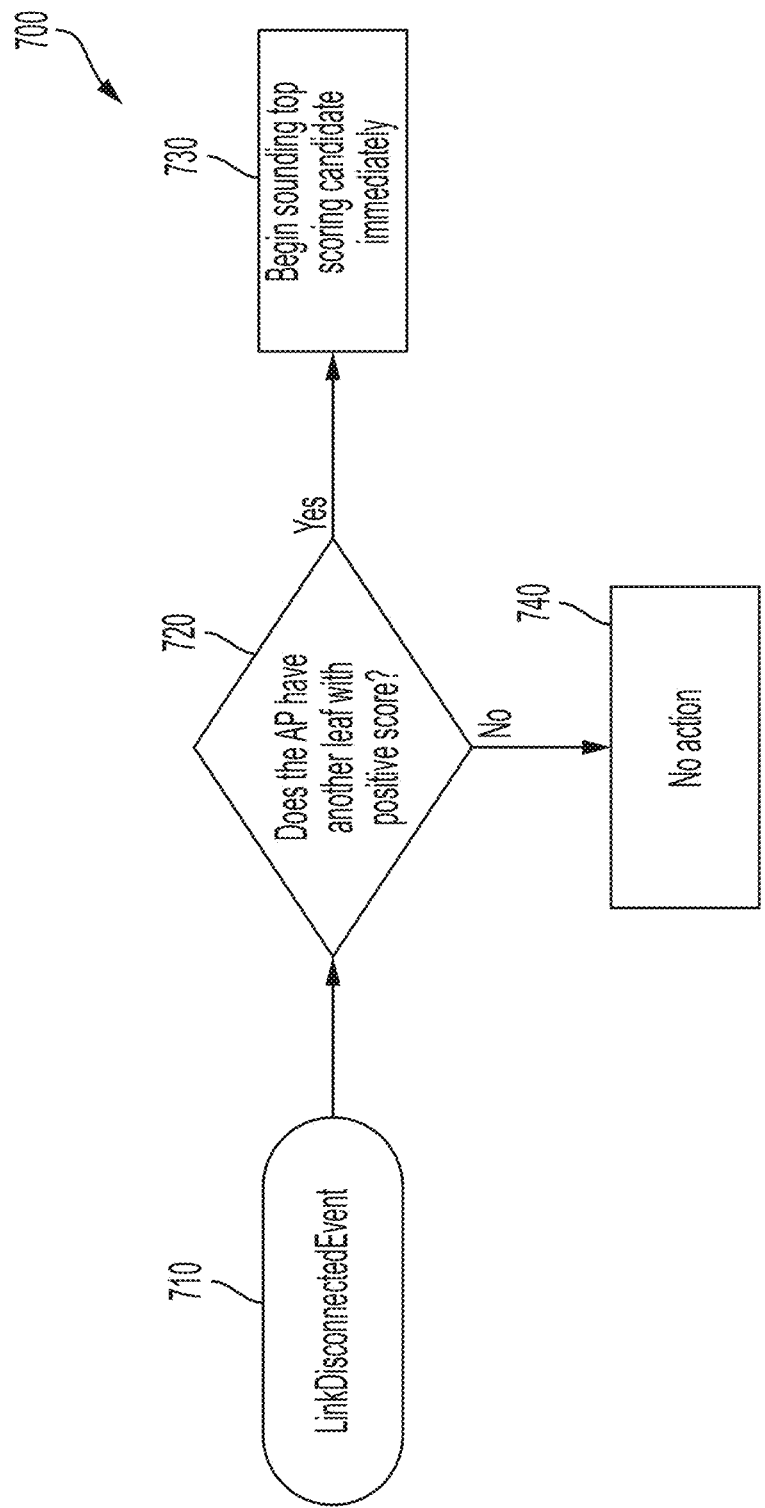
FIG. 7 is a block diagram showing an example process for a leaf node disconnection event.

FIG. 7 is a block diagram showing an example process for a fixed leaf node disconnection event. For example, a fixed leaf node being used for sounding by an AP in the motion detection system may lose connectivity with the AP, e.g. the device is disconnected from the network, power is lost, the device is moved out of the area, etc. This example process 700 is performed when an AP receives a link disconnect event at 710 indicating that a fixed leaf node is no longer communicating with the AP. In some implementations, at 720, the system determines whether the AP has at least one other fixed leaf node with a positive quality score (e.g. score 440 in FIG. 4). If so, at 730, the AP is directed to begin sounding the available top scoring fixed leaf node candidate immediately. Otherwise, at 740, the AP takes no action to replace the fixed leaf node at this time.

Figure 8:
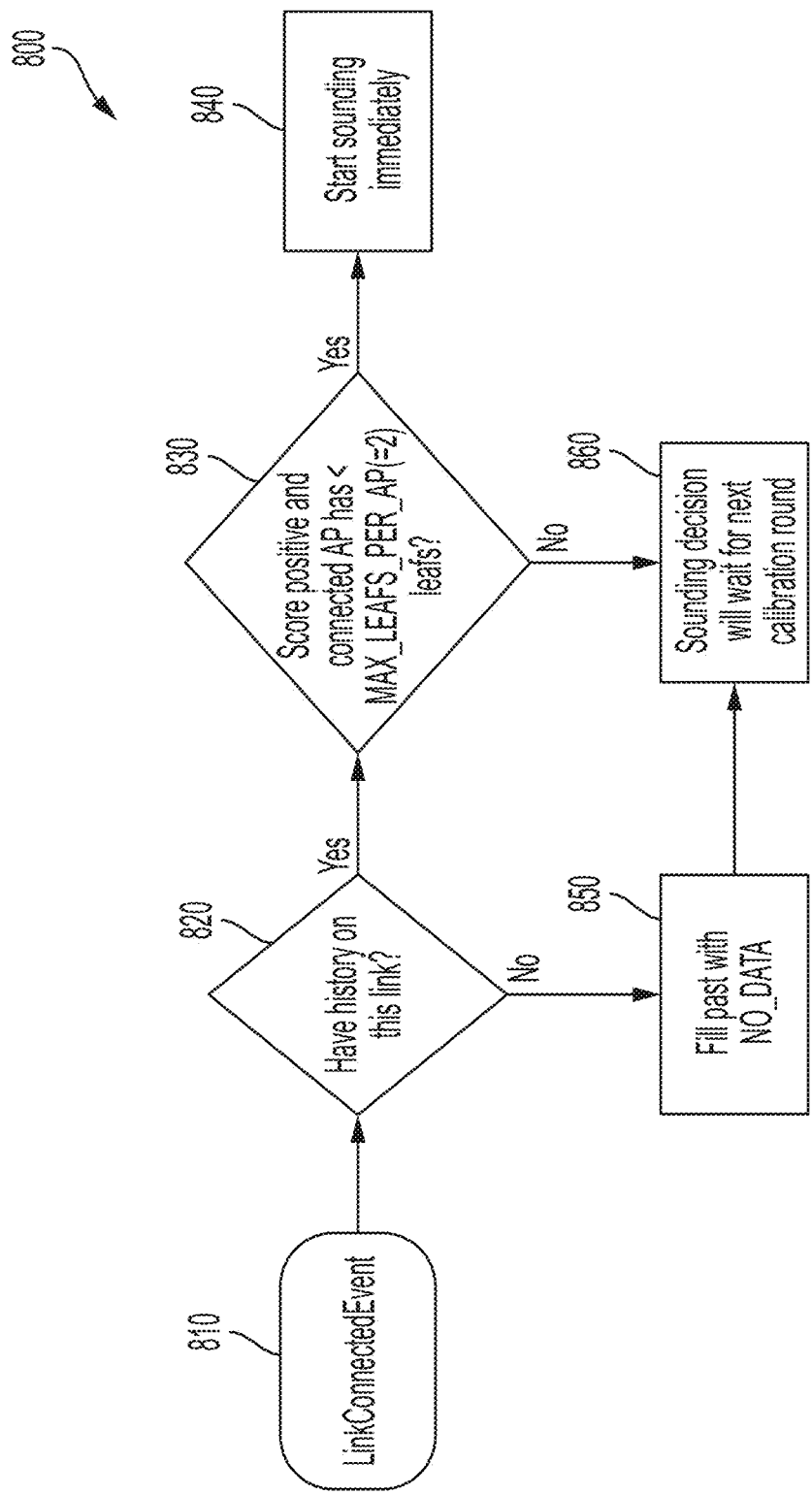
FIG. 8 is a block diagram showing an example process for a leaf node connection event.

FIG. 8 is a block diagram showing an example process for a leaf node connection event. In some implementations, this process 800 is performed when an AP receives a link connected event at 810 indicating that an AP-leaf node link has been established. The AP may detect the connected event at any time. In some implementations, at 820, it is determined whether the AP has prior history data associated with this new link, e.g. presence information metric 325 and quality statistics 326-329 data within the last 24 hours. If no history data is available for the AP-leaf node link, then at 850, the past history over the calibration window is set to default values, e.g. initialized to NO_DATA. An example of this is shown in FIG. 4 by the greyed boxes for certain AP-leaf node links 430 in certain calibration periods 420, e.g. AP0-Leaf1 has no prior historical data, therefore, each calibration period in the calibration window is defaulted to NODATA. At 860, the decision on whether the leaf node will be used for sounding is deferred until the next calibration period (e.g. as described in FIG. 6). On the other hand, if history is available for the AP-leaf node link, then at 830, if the AP-leaf node link has a positive quality score (e.g. score 440 in FIG. 4) and the AP is currently sounding less than its maximum number of leaf nodes (e.g. MAX_LEAFS_PER_AP<2), then at 840, the AP starts sounding the leaf node immediately. Otherwise, in instances that the AP is already sounding the maximum number of leaf nodes, then at 860, the decision on whether the leaf node will be used for sounding is deferred until the next calibration period (e.g. as described in FIG. 7).

Figure 9:
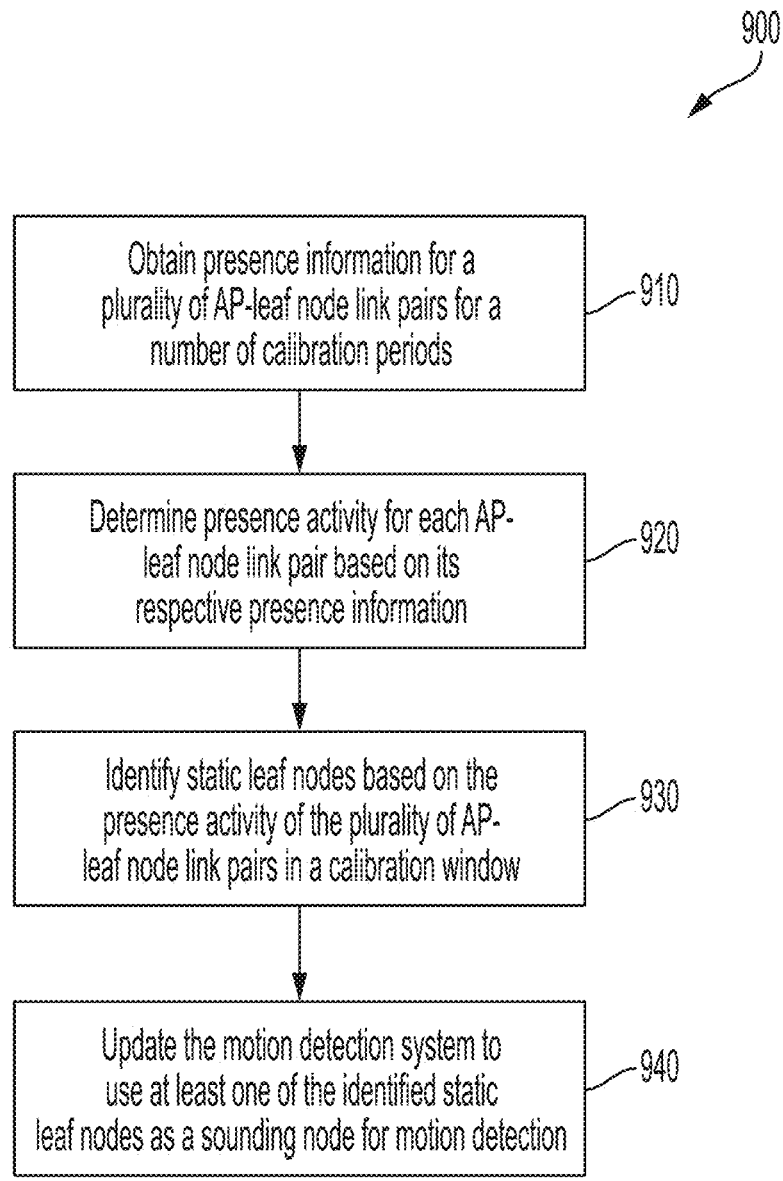
FIG. 9 is a block diagram showing an example process for identifying a static leaf node.

FIG. 9 is a block diagram showing an example process 900 for identifying a static leaf node. In some cases, one or more of the operations shown in FIG. 9 are implemented as processes that include multiple operations, sub-processes or other types of routines. In some cases, operations can be combined, performed in another order, performed in parallel, iterated, or otherwise repeated or performed another manner.

At 910, presence information is obtained for a plurality of AP-leaf node links for a number of calibration periods. As described in FIGS. 3-4, the presence information in a calibration period refers to the number of times during a calibration period when an AP-leaf node link is active.

In an implementation, a leaf node may be associated with links to one or more APs. In some instances, the presence information represents, or includes data that indicates, the number of times an AP-leaf node link is active in the motion detection system during a calibration period (e.g. an hour or other period of time), such as presence information 325 described in FIG. 3. In some cases, the AP is a hub for the motion detection system, and the AP obtains reports (e.g. network reports described in FIG. 3), from one or more other APs in the motion detection system (e.g. AP nodes 1210 described in FIG. 2), containing presence information for each of the other AP-leaf node links.

At 920, presence activity is determined for each AP-leaf node link based on its respective presence information. In some instances, an AP-leaf node link is determined to be present, or active, during a calibration period when presence information, e.g. presence information 325, for the AP-leaf node link exceeds a presence threshold for the calibration period. For example, when the AP-leaf node link is active for a certain percentage of time in the calibration period (e.g. presence information>=PRES_THRES (e.g. 9.0) in decision box 520 in FIG. 5), then the AP-leaf node link is determined to have sufficient presence activity to be considered present, or active for that calibration period (e.g. as shown in FIG. 4, the AP-leaf node links 430 that are determined to be present, or active, for a calibration period 420 are shown highlighted).

At 930, static leaf nodes are identified based on the presence activity of the plurality of AP-leaf node links in a calibration window. In an implementation, the AP-leaf node link is determined to be static when the AP-leaf node link is present for a number of calibration periods equal to the range of the calibration periods (e.g. the range 460 for AP0-Leaf0, AP1-Leaf0, and AP2-Leaf0, as illustrated in FIG. 4). For example, the presence activity of the AP-leaf node link is determined by calculating points 450 for each AP-leaf node link over the calibration window, as described in FIG. 4.

At 940, the motion detection system is updated to use at least one of the identified static leaf nodes as a sounding node for motion detection. The motion detection system can then use signals communicated to or from the sounding nodes to obtain channel information (e.g., channel response information, beamforming state information, etc.) that is used for motion detection.

In an implementation, one of the identified static leaf nodes is selected to add as a sounding node to the motion detection system, and a zone creation event is transmitted to the user for the selected static leaf node. In some cases, a unique local zone associated with the selected static leaf node is marked. In some cases, a static leaf node is selected by deriving a link quality score for each static AP-leaf node link for the calibration window (e.g. the score for each calibration period are assigned in FIG. 5 and summed for the calibration window in the table in FIG. 4). In some instances, the static AP-leaf node links are prioritized according to their respective link quality scores, and the static leaf node having a static AP-leaf node link with the highest link quality score is selected (e.g. AP0-Leaf0 in FIG. 4). In some implementations, the maximum number of leaf nodes per AP are selected to sound for a next time period based on a link quality score and location of identified static leaf nodes. In some instances, a static leaf node timer is started after updating the motion detection system to use at least one of the identified static leaf nodes as a sounding node for the motion detection system (e.g. the global static leaf cooldown described in FIG. 6).

Figure 10:
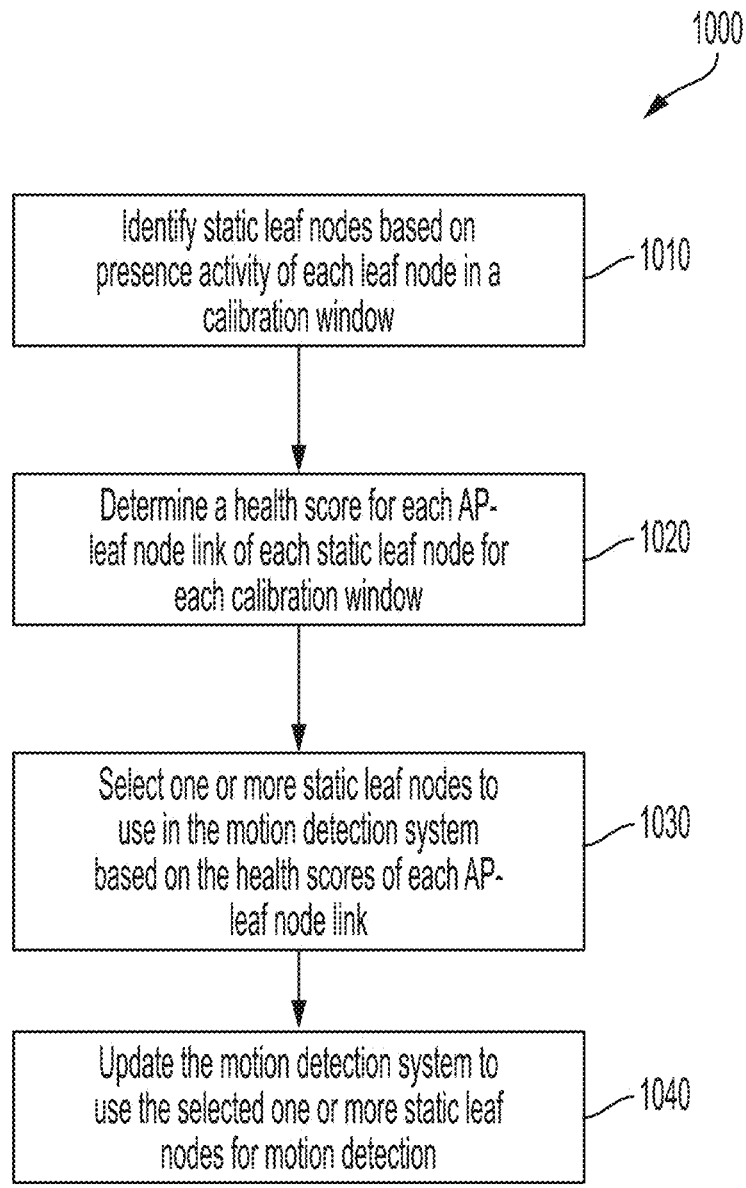
FIG. 10 is a block diagram showing an example process for classifying link quality of a static leaf node.

FIG. 10 is a block diagram showing an example process 1000 for classifying link quality of static leaf nodes. In some cases, one or more of the operations shown in FIG. 9 are implemented as processes that include multiple operations, sub-processes or other types of routines. In some cases, operations can be combined, performed in another order, performed in parallel, iterated, or otherwise repeated or performed another manner.

At 1010, static leaf nodes are identified based on presence activity of each leaf node in a calibration window. In some instances, the static leaf nodes may be identified as described in FIGS. 3-4 and/or using the process described in FIG. 9.

At 1020, a health score is determined for each AP-leaf node link of each static leaf node for each calibration window based on AP-leaf node link quality information. The AP-leaf node link quality information may include a success rate of sounding operations during a calibration period and a failure rate of sounding operations during a calibration period, as described in FIGS. 3-5. In some instances, the AP-leaf node link quality information may include an average link received signal strength indicator (RSSI), and a motion detection failure rate. In some implementations, determining a health score may include assigning each AP-leaf node link a classification based on its link quality information in each of the number of calibration periods. In some cases, the classification indicates a link quality is passing, noisy, or sleeping. A value may be assigned to each AP-leaf node link corresponding to its classification, and a health score is derived for each AP-leaf node link based on the assigned values in each of the number of calibration periods in the calibration window (e.g. as described in FIGS. 4-5). In an example, the health of the AP-link is passing when the success rate of sounding operations during the calibration period is above a first threshold and the failure rate of sounding operations during the calibration period is below a second threshold. In another example, the health of the AP-link is noisy when the success rate of sounding operations during the calibration period is below a third threshold and the failure rate of sounding operations during the calibration period is above a fourth threshold.

At 1030, one or more static leaf nodes are selected to use in the motion detection system based on the health scores of each AP-leaf node link. In some cases, during selection of static leaf nodes, an AP-leaf node link with a negative health score is disabled, and therefore, not considered. In some cases, an AP-leaf node link with a positive health score is prioritized with other AP-leaf node links having positive health scores. In some implementations, the static leaf node with the highest AP-leaf node link health score is selected to use for sounding with the motion detection system.

At 1040, the motion detection system is updated to use the selected one or more static leaf nodes for motion detection. In some instances, the motion detection system is updated by determining that the motion detection system allows adding a new leaf node at this time. Then a zone creation event is transmitted to the user (e.g., to a user device) for the selected fixed leaf node. In some implementations, the selected leaf node is marked as a unique local zone. In some implementations, the AP obtains presence and link quality information for a plurality of AP-leaf node links for the number of calibration periods, and initiates a calibration event for the calibration window. In some cases, the AP is a hub for the motion detection system and, the AP obtains reports from one or more other APs in the motion detection system containing presence and link quality information for each of the other AP-leaf node links.

Figure 11:
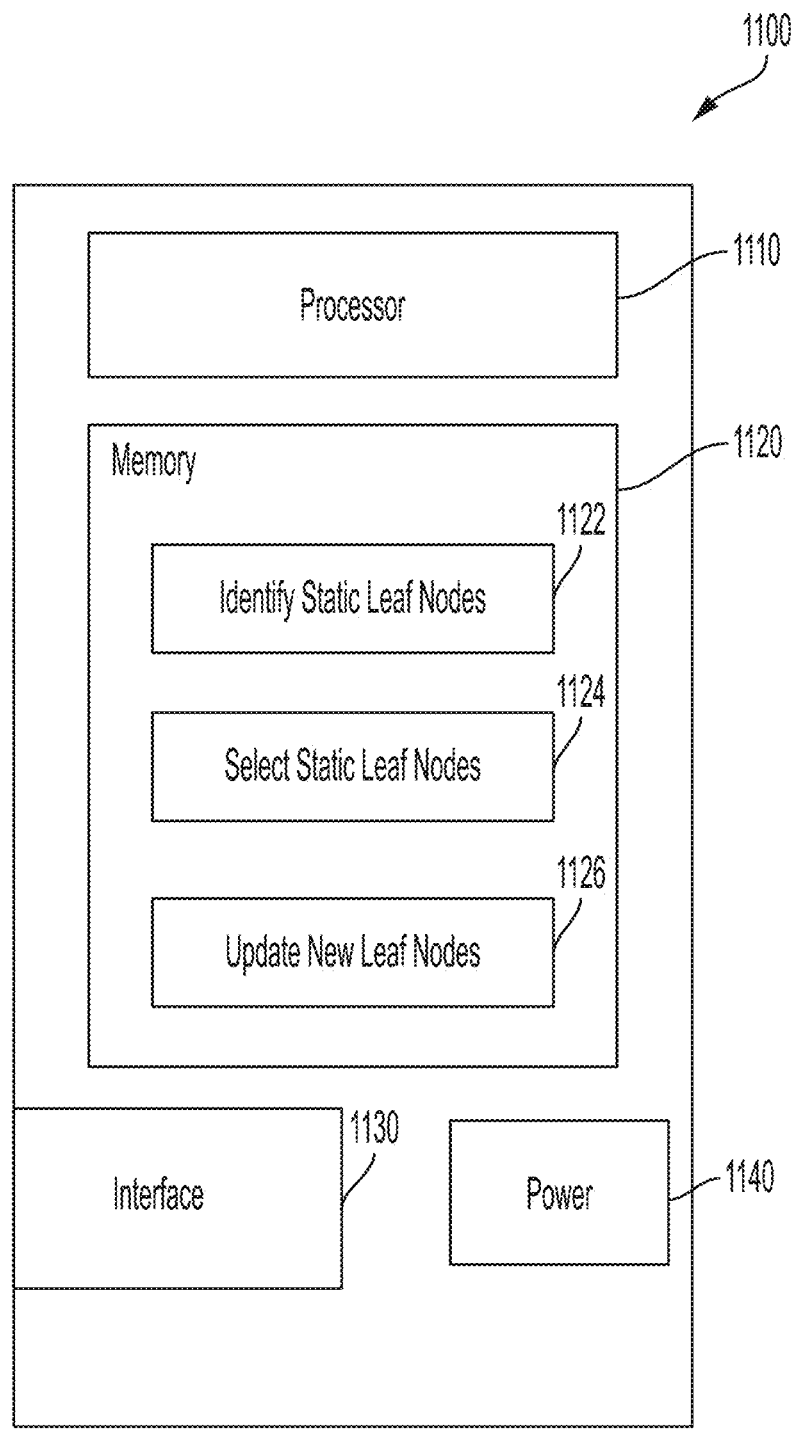
FIG. 11 is a block diagram showing an example wireless communication device.

FIG. 11 is a block diagram showing an example wireless communication device 1100. As shown in FIG. 11, the example wireless communication device 1100 includes an interface 1130, a processor 1110, a memory 1120, and a power unit 140. For example, any of the wireless communication devices 102A, 102B, 102C in the wireless communication system 1100 illustrated in FIG. 1 may include the same, additional or different components, and the components may be configured to operate as shown in FIG. 1 or in another manner. In some instances, the example wireless communications device may be configured as an access point (AP), or as a hub in a mesh network comprising multiple APs. In some implementations, the interface 1130, processor 1110, memory 1120, and power unit 1140 of a wireless communication device are housed together in a common housing or other assembly. In some implementations, one or more of the components of a wireless communication device can be housed separately, for example, in a separate housing or other assembly.

The example interface 1130 can communicate (receive, transmit, or both) wireless signals. For example, the interface 1130 may be configured to communicate radio frequency (RF) signals formatted according to a wireless communication standard (e.g., Wi-Fi or Bluetooth). In some cases, the example interface 1130 may be implemented as a modem. In some implementations, the example interface 1130 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in the interface 1130 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in the interface 1130 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some cases, the example interface 1130 can communicate wireless network traffic (e.g., data packets, including network reports described in FIG. 3) and other types of signals (e.g., motion probe signals, such as sounding signals). In some instances, the interface 1130 generates motion probe signals for transmission, for example, to probe a space to detect motion or lack of motion. In some implementations, the motion probe signals include standard signaling or communication frames that include standard pilot signals used in channel sounding (e.g., channel sounding for beamforming according to the IEEE 802.11ac-2013 standard). In some cases, the motion probe signals include reference signals known to all devices in the network. In some instances, the baseband subsystem may process received signals, for example, to detect connection and disconnection events from leaf nodes, to detect presence activity, and to detect motion of an object in a space. For example, the interface 1130 may analyze aspects of standard signaling protocols (e.g., channel sounding for beamforming according to the IEEE 802.11ac-2013 standard, such as, based on the steering or other matrix generated) to detect changes in the channel as a result of motion in the space.

The example processor 1110 can execute instructions, for example, to generate output data based on data inputs. The instructions can include programs, codes, scripts, modules, or other types of data stored in memory 1120, e.g. database 1140. Additionally or alternatively, the instructions can be encoded as pre-programmed or re-programmable logic circuits, logic gates, or other types of hardware or firmware components or modules. The processor 1110 may be or include a general-purpose microprocessor, as a specialized co-processor or another type of data processing apparatus. In some cases, the processor 1110 performs high level operation of the wireless communication device 1100. For example, the processor 1110 may be configured to execute or interpret software, scripts, programs, modules, functions, executables, or other instructions stored in the memory 1120. In some implementations, the processor 1110 be included in the interface 630.

The example memory 1120 may include computer-readable storage media, for example, a volatile memory device, a non-volatile memory device, or both. The memory 1120 may include one or more read-only memory devices, random-access memory devices, buffer memory devices, or a combination of these and other types of memory devices. In some instances, one or more components of the memory can be integrated or otherwise associated with another component of the wireless communication device 1100. The memory 1120 may store instructions that are executable by the processor 610. For example, the instructions may include instructions for the example wireless communication device 1100 (e.g. an AP) to obtain presence information for a plurality of AP-leaf node links for a number of calibration periods. The instructions, when executed, may cause the device to determine presence activity for each AP-leaf node link in each calibration period based on its respective presence information and identify static leaf nodes based on the presence activity for the plurality of AP-leaf node links in a calibration window, where the calibration window includes a number of the plurality of calibration periods. The instructions may further update the motion detection system to use at least one of the identified static leaf nodes as a sounding node for motion detection, such as through one or more of the operations as described in FIGS. 3-5 or in the example process 900 described in FIG. 9. In another example, the instructions may include instructions for the example wireless communication device 1100 (e.g. an AP) to identify one or more static leaf nodes based on presence activity of each leaf node in a calibration window comprising a number of calibration periods. The instructions may further cause the device to determine a health score for each AP-leaf node link of each static leaf node for each calibration window based on AP-leaf node link quality information, select one or more of the static leaf nodes to use for sounding in the motion detection system based on the health scores for each of the AP-leaf node links. The instructions may further cause the device to update the motion detection system to use the selected one or more static leaf nodes for motion detection, such as through one or more of the operations as described in FIGS. 3-5 or in the example process 1000 described in FIG. 10. In some instances, the memory 1120 may include one or more instruction sets or modules, for example, to identify static leaf nodes 1122, select static leaf nodes 1124, and/or update new leaf nodes in the motion detection system 1126, comprising the instructions described above.

The example power unit 1140 provides power to the other components of the wireless communication device 1100. For example, the other components may operate based on electrical power provided by the power unit 1140 through a voltage bus or other connection. In some implementations, the power unit 1140 includes a battery or a battery system, for example, a rechargeable battery. In some implementations, the power unit 1140 includes an adapter (e.g., an AC adapter) that receives an external power signal (from an external source) and coverts the external power signal to an internal power signal conditioned for a component of the wireless communication device 1100. The power unit 620 may include other components or operate in another manner.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, a motion detection system identifies static leaf nodes for motion detection.

In a first example, an access point (AP) obtains presence information for a plurality of AP-leaf node links, for a number of calibration periods. Presence activity is determined for each AP-leaf node link in each calibration period based on its respective presence information. Static leaf nodes are identified based on the presence activity for the plurality of AP-leaf node links in a calibration window, the calibration window comprising a number of the plurality of calibration periods. The motion detection system is updated to use at least one of the identified static leaf node as a sounding node for motion detection.

Implementations of the first example may include one or more of the following features. A leaf node is associated with one or more AP-leaf node links. Presence information comprises the number of times an AP-leaf node link node is active in the motion detection system during a calibration period. Identifying static leaf nodes includes determining that an AP-leaf node link is present during a calibration period when presence activity for the AP-leaf node link exceeds a presence threshold during the calibration period, and determining an AP-leaf node link is static when the AP-leaf node link is present for a number of calibration periods equal to the range of the calibration periods. Updating the motion detection system includes selecting one of the identified static leaf nodes to add as a sounding node to the motion detection system, transmitting a zone creation event to the user for the selected static leaf node, and marking a unique local zone associated with the selected static leaf node. In some instances, selecting a static node includes deriving a link quality score for each static AP-leaf node link for the calibration window, prioritizing the static AP-leaf node links according to their respective link quality scores, and selecting the static leaf node having a static AP-leaf node link with the highest link quality score. Starting a static leaf node timer after updating the motion detection system to use at least one of the identified static leaf nodes as a sounding node for the motion detection system. The AP is a hub for the motion detection system, and the AP obtains reports from one or more other APs in the motion detection system containing presence information for each of the other AP-leaf node links.

In a second example, an access point (AP) of a motion detection system identifies one or more static leaf nodes based on presence activity of each leaf node in a calibration window, the calibration window comprising a number of calibration periods. A health score is determined for each AP-leaf node link of each static leaf node for each calibration window based on AP-leaf node link quality information. One or more of the static leaf nodes are selected to use for sounding in the motion detection system based on the health scores for each of the AP-leaf node links. The motion detection system is updated to use the selected one or more static leaf nodes for motion detection.

Implementations of the second example may include one or more of the following features. The AP-leaf node link quality information includes one or more of a success rate of sounding operations during a calibration period, a failure rate of sounding operations during a calibration period, an average link received signal strength indicator (RSSI), and a motion detection failure rate. Determining a health score includes assigning each AP-leaf node link a classification based on its link quality information in each of the number of calibration periods, assigning a value to each AP-leaf node link corresponding to its classification, and deriving a health score for each AP-leaf node link based on the assigned values The classification indicates a link quality is passing, noisy, or sleeping in each of the number of calibration periods in the calibration window. The health of the AP-link is passing when the success rate of sounding operations during the calibration period is above a first threshold and the failure rate of sounding operations during the calibration period is below a second threshold, and the health of the AP-link is noisy when the success rate of sounding operations during the calibration period is below a third threshold and the failure rate of sounding operations during the calibration period is above a fourth threshold. Selecting static leaf nodes includes when an AP-leaf node link health score is negative, disabling the AP-leaf node link, when an AP-leaf node link health score is positive, prioritizing the AP-leaf node link with other AP-leaf node links having positive health scores, and then selecting the static leaf node with the highest AP-leaf node link health score to use for sounding with the motion detection system. Updating the motion detection system includes determining the motion detection system allows adding a new leaf node, transmitting a zone creation event to the user for the selected static leaf node, mark the selected leaf node as a unique local zone. Obtaining presence and link quality information for a plurality of AP-leaf node links for the plurality of calibration periods, and initiating a calibration event for the calibration window. The AP is a hub for the motion detection system, and the AP obtains reports from one or more other APs in the motion detection system containing presence information for each of the other AP-leaf node links.

In a third example, a non-transitory computer readable medium stores instructions that when executed by one or more processors, causes a device to perform one or more operations of the first example and/or second example.

In a fourth example, a device for managing nodes in a motion detection system includes one or more processors and a memory storing instructions which when executed by the one or more processors, causes the device to perform one or more operations of the first example and/or the second example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method for managing nodes in a motion detection system, comprising:
    identifying, by an access point (AP) of the motion detection system, one or more static leaf nodes based on presence activity of each static leaf node of the one or more static leaf nodes in a calibration window, the calibration window comprising a number of calibration periods;
    determining a health score for each AP-leaf node link for the calibration window based on AP-leaf node link quality information, each AP-leaf node link defined between the AP and one of the static leaf nodes of the one or more static leaf nodes,
    wherein determining a health score for each AP-leaf node link for the calibration window comprises:
        assigning each AP-leaf node link a classification based on quality information for the AP-leaf node link, wherein the classification indicates a link quality is passing, noisy, or sleeping,
        wherein the link quality of the AP-leaf node link is passing when a success rate of sounding operations during the calibration window is above a first threshold, and a failure rate of sounding operations during the calibration period is below a second threshold,
        wherein the link quality of the AP-leaf node link is noisy when the success rate of sounding operations during the calibration period is below a third threshold, and the failure rate of sounding operations during the calibration period is above a fourth threshold;
        assigning a value to each AP-leaf node link corresponding to the classification assigned to the AP-leaf node link; and
        deriving the health score for each AP-leaf node link based on the assigned values in each of the number of calibration periods in the calibration window;
    selecting one or more of the static leaf nodes to use for sounding in the motion detection system based on the health scores for each of the AP-leaf node links; and
    updating the motion detection system to use the selected one or more static leaf nodes for motion detection.

2. The method of claim 1, wherein the AP-leaf node link quality information comprises one or more of:
    a success rate of sounding operations during a calibration period;
    a failure rate of sounding operations during a calibration period;
    an average link received signal strength indicator (RSSI); and
    a motion detection failure rate.

3. The method of claim 1, wherein selecting one or more of the static leaf nodes to use in the motion detection system based on the health scores for each of the AP-leaf node link comprises:
    when an AP-leaf node link health score is negative, disabling the AP-leaf node link;
    when an AP-leaf node link health score is positive, prioritizing the AP-leaf node link with other AP-leaf node links having positive health scores; and
    selecting the leaf node with the highest AP-leaf node link health score to use with the motion detection system.

4. The method of claim 1, wherein updating the motion detection system to use at least one of the one or more static leaf nodes for motion detection, comprises:
    determining the motion detection system allows adding a new leaf node;
    transmitting, to a user device, a zone creation event to for the selected static leaf node;
    marking the selected leaf node as a unique local zone.

5. The method of claim 1, comprising:
    obtaining, by the AP, presence and link quality information for a plurality of AP-leaf node links for the number of calibration periods; and
    initiating a calibration event for the calibration window.

6. The method of claim 5, wherein the AP operates as a hub for the motion detection system, and the AP obtains reports from one or more other APs in the motion detection system containing presence and link quality information for each of the other AP-leaf node links.

7. A device for managing nodes in a motion detection system, comprising:
    one or more processors; and
    memory comprising instructions which when executed by the one or more processors cause the device to perform operations comprising:
        identifying, by an access point (AP) of the motion detection system, one or more static leaf nodes based on presence activity of each static leaf node of the one or more static leaf nodes in a calibration window, the calibration window comprising a number of calibration periods;
        determining a health score for each AP-leaf node link for the calibration window based on AP-leaf node link quality information, each AP-leaf node link defined between the AP and one of the static leaf nodes of the one or more static leaf nodes,
        wherein determining a health score for each AP-leaf node link for the calibration window comprises:
            assigning each AP-leaf node link a classification based on quality information for the AP-leaf node link, wherein the classification indicates a link quality is passing, noisy, or sleeping,
            wherein the link quality of the AP-leaf node link is passing when a success rate of sounding operations during the calibration window is above a first threshold, and a failure rate of sounding operations during the calibration period is below a second threshold,
            wherein the link quality of the AP-leaf node link is noisy when the success rate of sounding operations during the calibration period is below a third threshold, and the failure rate of sounding operations during the calibration period is above a fourth threshold;
            assigning a value to each AP-leaf node link corresponding to the classification assigned to the AP-leaf node link; and deriving the health score for each AP-leaf node link based on the assigned values in each of the number of calibration periods in the calibration window;

selecting one or more of the static leaf nodes to use for sounding in the motion detection system based on the health scores for each of the AP-leaf node links; and updating the motion detection system to use the selected one or more static leaf nodes for motion detection.

8. The device of claim 7, wherein the AP-leaf node link quality information comprises one or more of:
   a success rate of sounding operations during a calibration period;
   a failure rate of sounding operations during a calibration period;
   an average link received signal strength indicator (RSSI); and
   a motion detection failure rate.

9. The device of claim 7, wherein selecting one or more of the static leaf nodes to use in the motion detection system based on the health scores for each of the AP-leaf node link comprises:
   when an AP-leaf node link health score is negative, disabling the AP-leaf node link;
   when an AP-leaf node link health score is positive, prioritizing the AP-leaf node link with other AP-leaf node links having positive health scores; and
   selecting the leaf node with the highest AP-leaf node link health score to use with the motion detection system.

10. The device of claim 7, wherein updating the motion detection system to use at least one of the one or more static leaf nodes for motion detection, comprises:
   determining the motion detection system allows adding a new leaf node;
   transmitting, to a user device, a zone creation event to for the selected static leaf node;
   marking the selected leaf node as a unique local zone.

11. The device of claim 7, the operations comprising:
   obtaining, by the AP, presence and link quality information for a plurality of AP-leaf node links for the number of calibration periods; and
   initiating a calibration event for the calibration window.

12. The device of claim 11, wherein the AP is configured to operate as a hub for the motion detection system, and the AP is configured to obtain reports from one or more other APs in the motion detection system containing presence and link quality information for each of the other AP-leaf node links.

13. A non-transitory computer readable medium comprising instructions which when executed by data processing apparatus cause the data processing apparatus to perform operations comprising:
   identifying, by an access point (AP) of the motion detection system, one or more static leaf nodes based on presence activity of each static leaf node of the one or more static leaf nodes in a calibration window, the calibration window comprising a number of calibration periods;
   determining a health score for each AP-leaf node link for the calibration window based on AP-leaf node link quality information, each AP-leaf node link defined between the AP and one of the static leaf nodes of the one or more static leaf nodes,
   wherein determining a health score for each AP-leaf node link for the calibration window comprises:
      assigning each AP-leaf node link a classification based on quality information for the AP-leaf node link, wherein the classification indicates a link quality is passing, noisy, or sleeping,
      wherein the link quality of the AP-leaf node link is passing when a success rate of sounding operations during the calibration window is above a first threshold, and a failure rate of sounding operations during the calibration period is below a second threshold,
      wherein the link quality of the AP-leaf node link is noisy when the success rate of sounding operations during the calibration period is below a third threshold, and the failure rate of sounding operations during the calibration period is above a fourth threshold;
      assigning a value to each AP-leaf node link corresponding to the classification assigned to the AP-leaf node link; and
      deriving the health score for each AP-leaf node link based on the assigned values in each of the number of calibration periods in the calibration window;
   selecting one or more of the static leaf nodes to use for sounding in the motion detection system based on the health scores for each of the AP-leaf node links; and
   updating the motion detection system to use the selected one or more static leaf nodes for motion detection.

14. The non-transitory computer readable medium of claim 13, wherein the AP-leaf node link quality information comprises one or more of:
   a success rate of sounding operations during a calibration period;
   a failure rate of sounding operations during a calibration period;
   an average link received signal strength indicator (RSSI); and
   a motion detection failure rate.

15. The non-transitory computer readable medium of claim 13, wherein selecting one or more of the static leaf nodes to use in the motion detection system based on the health scores for each of the AP-leaf node link comprises:
   when an AP-leaf node link health score is negative, disabling the AP-leaf node link;
   when an AP-leaf node link health score is positive, prioritizing the AP-leaf node link with other AP-leaf node links having positive health scores; and
   selecting the leaf node with the highest AP-leaf node link health score to use with the motion detection system.

16. The non-transitory computer readable medium of claim 13, wherein updating the motion detection system to use at least one of the one or more static leaf nodes for motion detection, comprises:
   determining the motion detection system allows adding a new leaf node;
   transmitting, to a user device, a zone creation event to for the selected static leaf node;
   marking the selected leaf node as a unique local zone.

17. The non-transitory computer readable medium of claim 13, the operations comprising:
   obtaining, by the AP, presence and link quality information for a plurality of AP-leaf node links for the number of calibration periods; and
   initiating a calibration event for the calibration window.

18. The non-transitory computer readable medium of claim 13, wherein the AP operates as a hub for the motion detection system, and the AP obtains reports from one or more other APs in the motion detection system containing presence and link quality information for each of the other AP-leaf node links.

* * * * *

UNITED STATES PATENT AND TRADEMARK OFFICE
CERTIFICATE OF CORRECTION

PATENT NO. : 10,498,467 B1
APPLICATION NO. : 16/256377
DATED : December 3, 2019
INVENTOR(S) : Ravkine Page 1 of 1

It is certified that error appears in the above-identified patent and that said Letters Patent is hereby corrected as shown below:

In the Specification

Column 10, Line 35, delete "the the" and insert -- the -- therefor.

Column 10, Line 52, delete "reports" and insert -- periods -- therefor.

Column 15, Line 44, delete "(Irate)," and insert -- ('frate'), -- therefor.

Column 19, Line 12, delete "140." and insert -- 1140. -- therefor.

Column 20, Line 51, delete "630." and insert -- 1130. -- therefor.

Column 20, Line 62, delete "610." and insert -- 1110. -- therefor.

Column 21, Line 43, delete "620" and insert -- 1140 -- therefor.

Signed and Sealed this
Third Day of March, 2020

Andrei Iancu
*Director of the United States Patent and Trademark Office*